(12) United States Patent
Choi et al.

(10) Patent No.: US 12,244,945 B2
(45) Date of Patent: Mar. 4, 2025

(54) IMAGE SENSOR INCLUDING PHASE DETECTION PIXELS

(71) Applicant: SAMSUNG ELECTRONICS CO., LTD., Suwon-si (KR)

(72) Inventors: Wonchul Choi, Suwon-si (KR); Kyungho Lee, Suwon-si (KR); Heesang Kwon, Suwon-si (KR); Seoyun Park, Suwon-si (KR); Jung Bin Yun, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 18/112,132

(22) Filed: Feb. 21, 2023

(65) Prior Publication Data

US 2024/0031698 A1    Jan. 25, 2024

(30) Foreign Application Priority Data

Jul. 25, 2022    (KR) .................. 10-2022-0091717

(51) Int. Cl.
*H04N 25/704*    (2023.01)
*H04N 25/13*    (2023.01)
*H04N 25/77*    (2023.01)
*H04N 25/78*    (2023.01)

(52) U.S. Cl.
CPC ........... *H04N 25/704* (2023.01); *H04N 25/77* (2023.01); *H04N 25/78* (2023.01); *H04N 25/134* (2023.01)

(58) Field of Classification Search
CPC ...... H04N 25/134; H04N 25/44; H04N 25/46; H04N 25/704; H04N 25/77; H04N 25/778; H04N 25/78
See application file for complete search history.

(56) References Cited

U.S. PATENT DOCUMENTS

| | | |
|---|---|---|
| 10,044,959 B2 | 8/2018 | Galor Gluskin |
| 10,931,865 B2 | 2/2021 | Wada |
| 10,944,929 B2 | 3/2021 | Wan et al. |
| 11,050,921 B2 | 6/2021 | Nakata |
| 11,233,957 B2 | 1/2022 | Miyakoshi |
| 11,265,496 B2 | 3/2022 | Kim et al. |
| 11,297,219 B2 | 4/2022 | Kim et al. |
| 2016/0065835 A1* | 3/2016 | Hirose ................ G02B 7/102 348/353 |
| 2021/0120168 A1 | 4/2021 | Shim et al. |
| 2021/0337144 A1 | 10/2021 | Wang et al. |

(Continued)

FOREIGN PATENT DOCUMENTS

KR    10-2020-0142440 A    12/2020

*Primary Examiner* — Amy R Hsu
(74) *Attorney, Agent, or Firm* — Muir Patent Law, PLLC

(57) ABSTRACT

An image sensor according to the present disclosure includes: a first pixel group, which includes a first pixel unit corresponding to a first color, and a plurality of first pixels arranged with an m×n form. The image sensor further includes a second pixel unit, which corresponds to a second color, and a plurality of second pixels arranged with the m×n form. The image sensor further includes a third pixel unit, which corresponds to a third color, and a plurality of third pixels arranged with the m×n form, and m and n are natural numbers greater than or equal to 3. A first micro lens is formed on the first pixel unit and shared by at least two adjacent first pixels in a first direction among the plurality of first pixels.

20 Claims, 17 Drawing Sheets

(56) References Cited

U.S. PATENT DOCUMENTS

| | | | |
|---|---|---|---|
| 2022/0102414 A1* | 3/2022 | Lee | H04N 25/42 |
| 2022/0344389 A1* | 10/2022 | Pyo | H01L 27/14627 |
| 2022/0384513 A1* | 12/2022 | Noh | H04N 25/78 |
| 2023/0101860 A1* | 3/2023 | Moon | H04N 23/55 |

* cited by examiner

| PG1 | PG3 | PG2 | PG3 | PG1 |
| PG1 | PG3 | PG2 | PG3 | PG1 |

IMAGE SENSOR INCLUDING PHASE DETECTION PIXELS

CROSS-REFERENCE TO RELATED APPLICATION

Korean Patent Application No. 10-2022-0091717 filed on Jul. 25, 2022, in the Korean Intellectual Property Office is incorporated herein by reference in its entirety.

BACKGROUND

1. Field

Embodiments relate to an image sensor including phase-detection pixel.

2. Description of the Related Art

An image sensor may provide a phase detection auto-focus (PDAF) function that focuses on an object when photographing the object. The phase detection auto-focus (PDAF) technology is a technique to determine whether a subject is in focus by comparing a phase difference of light that is divided while passing through a single micro-lens located on a phase detection pixel positioned adjacently, that is, the phase difference of light incident on a pixel array and allows a camera to focus faster. The phase-detection pixels required to perform the phase detection auto-focus (PDAF) may be discontinuously or regularly located within the pixel array.

The above information disclosed in this Background section is only for enhancement of understanding of the background of the invention, and therefore it may contain information that does not form prior art that is known in this country to a person of ordinary skill in the art.

SUMMARY

Embodiments are directed to an image sensor including a phase detection pixel capable of detecting a phase difference for an object to provide an image sensor with improved sensitivity.

An image sensor according to an embodiment includes: a first pixel group, which includes a first pixel unit corresponding to a first color, and a plurality of first pixels arranged with an m×n form. The image sensor further includes second pixel unit, which corresponds to a second color, and a plurality of second pixels arranged with an m×n form. The image sensor further includes a third pixel unit, which corresponds to a third color, and a plurality of third pixels arranged with the m×n form. The characters "m" and "n" represent natural numbers greater than or equal to 3. The image sensor further includes a first micro lens formed on the first pixel unit and shared by at least two adjacent first pixels in a first direction among the plurality of first pixels.

Some embodiments may include a second pixel group including a fifth pixel unit corresponding to the first color and including a plurality of fifth pixels arranged with the m×n form, a sixth pixel unit corresponding to the second color and including a plurality of sixth pixels arranged with the m×n form, and a seventh pixel unit corresponding to the third color and including a plurality of seventh pixels arranged with the m×n form. The image sensor may further include a second micro lens formed on the fifth pixel unit and shared by at least two fifth pixels adjacent in the first direction among the plurality of fifth pixels.

Some embodiments may include a readout circuit to detect a phase difference for an object of the image sensor based on the charge of each of a first pixel of at least two first pixels positioned at one end of the first direction and a fifth pixel of at least two fifth pixels positioned at the other end of the first direction may be further included.

Some embodiments may include a row driver connected to the pixel array through a plurality of row lines, and the first pixel of at least two first pixels positioned at one end of the first direction and the fifth pixel of at least two fifth pixels positioned at the other end of the first direction may be connected together to a first-row line among a plurality of row lines.

In some embodiments, the first pixel group may further include a fourth pixel unit, which is adjacent to the first pixel unit in an oblique direction to the first direction. The fourth pixel unit corresponds to the first color and includes a plurality of fourth pixels arranged with the m×n form. The image sensor may further include a third micro lens shared by at least two fourth pixels adjacent in the first direction among the plurality of fourth pixels.

In some embodiments, the second pixel group may further include an eighth pixel unit, which is adjacent to the fifth pixel unit in an oblique direction to the first direction, corresponds to the first color, and includes a plurality of eighth pixel arranged with the m×n form The image sensor may further include a fourth micro lens shared by at least two eighth pixels adjacent in the first direction among the plurality of eighth pixels.

Some embodiments may include a readout circuit to detect the phase difference for the object of the image sensor based on the charge of each of the fourth pixel positioned at one end of the first direction among at least two fourth pixels and the eighth pixel positioned at the other end of the first direction among at least two eighth pixels.

Some embodiments may include a row driver connected to the pixel array through plurality of row lines. A fourth pixel positioned at one end of the first direction among at least two fourth pixels and a eighth pixel positioned at the other end of the first direction among at least two eighth pixels may be connected together to a first row line among a plurality of row lines.

In some embodiments, the first pixel group and the second pixel group may be adjacent in the first direction.

In some embodiments, the first pixel group and the second pixel group may be arranged repeatedly along a second direction intersecting the first direction.

In some embodiments, the first pixel group and the second pixel group may be adjacent to each other along a second direction intersecting the first direction.

In some embodiments, the first pixel group and the second pixel group may be alternately arranged along a second direction intersecting the first direction.

An image sensor according to an embodiment includes: a pixel array including a plurality of pixel groups including a first pixel unit corresponding to a first color and including a plurality of first pixels arranged with an m×n form, a second pixel unit corresponding to a second color and including a plurality of second pixels arranged with the m×n form, and a third pixel unit corresponding to a third color and including a plurality of third pixels arranged with the m×n form Each of a plurality of pixel groups includes a first phase detection pixel and a second phase detection pixel located adjacent to each other in a first direction and covered by one micro lens, and m and n are natural numbers greater than or equal to 3. The image sensor further includes a readout circuit detecting a phase difference for an object of the image sensor based on the charge of each of the first phase detection pixel of the first pixel group of the plurality of pixel groups and the second phase detection pixel of the second pixel group of the plurality of pixel groups.

In some embodiments, the first phase detection pixel and the second phase detection pixel of the first pixel group may be positioned in the first pixel unit of the first pixel group, and the first phase detection pixel and the second phase detection pixel of the second pixel group may be positioned in the first pixel unit of the second pixel group. In some embodiments, a plurality of first pixels of the first pixel unit, and the first phase detection pixel and the second phase detection pixel of the first pixel group, may share a floating diffusion, and the readout circuit may generate an image signal based on the charge accumulated in the floating diffusion by a plurality of first pixels and the first phase detection pixel and the second phase detection pixel of the first pixel group.

In some embodiments, each of a plurality of pixel groups may further include a third phase detection pixel and a fourth phase detection pixel located adjacent to each other in the first direction and covered by one micro lens. The third phase detection pixel and the fourth phase detection pixel of the first pixel group may be positioned in the second pixel unit of the first pixel group. The third phase detection pixel and the fourth phase detection pixel of the second pixel group may be positioned in the second pixel unit of the second pixel group. The readout circuit may further detect a phase difference based on the charge of each of the third phase detection pixel of the first pixel group and the fourth phase detection pixel of the second pixel group.

Some embodiments may include a row driver connected to the pixel array through a plurality of row lines. The first phase detection pixel of the first pixel group and the second phase detection pixel of the second pixel group may be connected together to a first-row line among a plurality of row lines.

In some embodiments, the pixel array may further include a third pixel group without the first phase detection pixel and the second phase detection pixel between the first pixel group and the second pixel group.

An image sensor according to an embodiment includes a pixel array including a plurality of pixel groups including a first phase detection pixel and a second phase detection pixel located adjacent to each other in a first direction and covered by one micro lens. The phase-detection pixels output a phase signal based on a charge of each of the first phase detection pixel of the first pixel group among the plurality of pixel groups and the second phase detection pixel of the second pixel group among the plurality of pixel groups. The image sensor further includes a ramp signal generator that sequentially generates a reset reference signal and a first set reference signal during a unit frame period. The image sensor further includes a readout circuit that detects a phase difference for the object of the image sensor based on a result of comparing a plurality of reset pixel signals received from the pixel array through a plurality of column lines with the reset reference signal and a result of comparing a first phase signal received from the first phase detection pixel and a second phase signal received from the second phase detection pixel with the first set reference signal.

In some embodiments, each of the plurality of pixel groups may include a plurality of pixel units. The first phase detection pixel and the second phase detection pixel may be positioned in a first pixel unit among a plurality of pixel units of the first pixel group. The first pixel unit may further include a plurality of image sensing pixels. The first phase detection pixel and the second phase detection pixel in the first pixel unit of the first pixel group and the plurality of image sensing pixels of the first pixel unit may share a first floating diffusion. The pixel array may output an image signal based on the charge accumulated in the first floating diffusion. The ramp signal generator may further generate a second set reference signal. The readout circuit may derive image information for an object of the image sensor based on the result of comparing the second set reference signal and the image signal.

BRIEF DESCRIPTION OF THE DRAWINGS

Features will become apparent to those of skill in the art by describing in detail exemplary embodiments with reference to the attached drawings in which:

FIG. 9 is a top plan view showing a pixel arrangement of a pixel array according to an embodiment.

FIG. 11 to FIG. 14 are top plan views showing a pixel arrangement of a pixel array according to an embodiment.

FIG. 15 and FIG. 16 are top plan views showing a pixel arrangement of a pixel array according to an embodiment.

DETAILED DESCRIPTION

Figure 1:
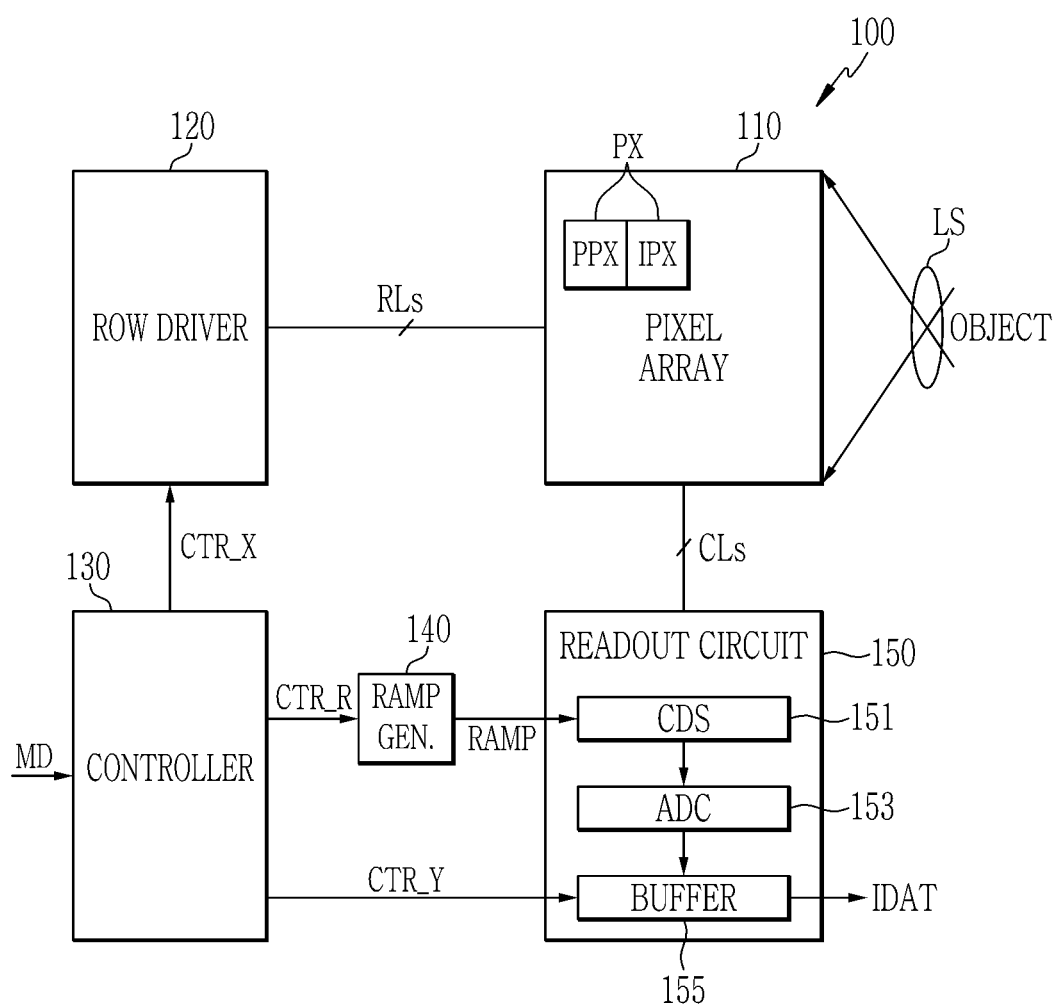
FIG. 1 is a block diagram of an image sensor according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

In addition, expressions written in the singular may be construed in the singular or plural unless an explicit expression such as "one" or "single" is used. Terms including ordinal numbers such as first, second, and the like will be used only to describe various components and are not to be interpreted as limiting these components. These terms may be used for the purpose of distinguishing one constituent element from other constituent elements.

FIG. 1 is an exemplary block diagram of an image sensor according to an embodiment.

Referring to FIG. 1, an image sensor 100 may include a lens LS, a pixel array 110, a row driver 120, a controller 130, a ramp signal generator 140, and a readout circuit 150. Although not shown in FIG. 1, the image sensor 100 may further include a clock signal generator, a signal processor, a column decoder, and/or a memory.

The image sensor 100 may convert an optical signal of an object OBJECT incident through an optical device into an electrical signal and generate image data DAT based on the converted electrical signal. The optical device may be an optical collection device including a mirror and the lens LS. For example, the image sensor 100 may use an optical device capable of condensing various paths of light reflected by an object OBJECT or changing a movement path of light by using optical characteristics such as light dispersion or refraction. In the present disclosure, for better understanding and ease of description, it is described that the lens LS is used, but the present invention is not limited thereto, and the image sensor 100 may use various optical devices.

The image sensor 100 may be mounted on an electronic device having an image or optical sensing function. For example, the image sensor 100 may be mounted to electric devices such as a camera, a smartphone, a wearable device, an Internet of Things (IoT) device, a home appliance, a tablet personal computer (PC), a personal digital assistant (PDA), or a portable multimedia player (PMP), a navigation device, a drone, and an advanced driver assistance system (ADAS). Alternatively, the image sensor 100 may be mounted on an electronic device provided as a component in a vehicle, furniture, manufacturing equipment, a door, various measurement devices, and the like.

The pixel array 110 may be a Complementary Metal Oxide Semiconductor Image Sensor (CIS) that converts an optical signal into an electrical signal. The optical signal passing through the lens LS may reach the light receiving surface of the pixel array 110 to form an image of the subject. The pixel array 110 may adjust the sensitivity of the optical signal under the control of the controller 130.

The pixel array 110 may include a plurality of pixels PX, and a plurality of row lines RL and a plurality of column lines CL respectively connected to a plurality of pixels PX.

The row lines RL extend in the first direction and may be connected to pixels PX that are located along the first direction. For example, the row lines RL may transmit a control signal output from a row driver 120 to an element included in the pixel PX, for example, a transistor. The column lines CL extend in a second direction intersecting the first direction and may be connected to the pixels PX located along the second direction. The column lines CL may transmit the pixel signal output from the pixels PX to the readout circuit 150.

In some embodiments, each pixel PX may contain at least one photovoltaic device. The photovoltaic device may detect incident light and convert the incident light into an electric signal according to an amount of light, that is, a plurality of analog pixel signals. For example, the pixel array 110 may be implemented as a photovoltaic device such as a charge coupled device (CCD) or a complementary metal oxide semiconductor (CMOS) and may be implemented as various types of photovoltaic devices.

The pixel array 110 may include a plurality of pixels PX. The pixel PX may include a plurality of image sensing pixels IPX and a plurality of phase-detection pixels PPX.

A plurality of image sensing pixels IPX may generate image signals corresponding to the object OBJECT. A plurality of phase-detection pixels PPX may not only generate the image signals corresponding to the object OBJECT but may further generate phase signals used for focusing on the object OBJECT. The phase signals may include information on the positions of the image corresponding to the object OBJECT incident through the optical device. The image signals and the phase signals generated by a plurality of image sensing pixels IPX and a plurality of phase-detection pixels PPX may be transmitted to the readout circuit 150 through the column line CL. The readout circuit 150 may calculate the phase differences between images through the phase signals.

A color filter and a micro lens may be stacked on each of a plurality of image sensing pixels IPX and a plurality of phase-detection pixels PPX. The color filter may transmit light of a specific color, that is, a wavelength of a specific color region, among the light incident through the micro lens. The color detectable by the pixel PX may be determined according to the color filter provided in a plurality of image sensing pixels IPX and a plurality of phase-detection pixels PPX. However, the present invention is not limited thereto, and the photovoltaic device in the pixel PX may convert light corresponding to the wavelength of the specific color region into an electrical signal according to a level (e.g., a voltage level) of the applied electric signal. That is, the color that the pixel PX may detect may be determined according to the level of the electric signal applied to the photovoltaic device.

Hereinafter, a pixel that responds to the wavelength of the red region among visible light regions and generates the image signal corresponding to a red color signal is called a red pixel. In addition, a pixel that generates the image signal corresponding to a green color signal by responding to the wavelengths of a green region among visible light regions is called a green pixel. Furthermore, a pixel that generates the image signal corresponding to a blue color signal in response to wavelengths of a blue region among visible light regions is called a blue pixel.

The row driver 120 may generate a control signal for driving the pixel array 110 in response to the control signal (e.g., a row control signal CTR_X) of the controller 130 and provide the control signal to a plurality of pixels PX of the pixel array 110 through a plurality of row lines RL. In some embodiments, the row driver 120 may control the pixel PX to sense the incident light to the row line unit. A row line unit may include at least one row line.

Also, the row driver 120 may select the pixels among a plurality of pixels PX by a row line unit, provide a reset signal to the selected pixels (e.g., the pixels located in one row) to reset the pixels, and control the voltages generated by the selected pixels to be output to a plurality of column lines CLs. Here, resetting the pixel PX means removing the electric signal (e.g., the voltage) generated by the photovoltaic device in the pixel PX.

The controller 130 may overall control each constituent element 110, 120, 140, and 150 included in the image sensor 100. The controller 130 may control the operation timing of each constituent element 110, 120, 140, and 150 by using control signals. For example, the controller 130 may provide a row control signal CTR_X to the row driver 120, and the row driver 120 controls to detect the pixel array 110 by the row line unit through the row line RL based on the row control signal CTR_X. For example, the controller 130 may provide a lamp control signal CTR_R for controlling the ramp signal to the lamp generator 140, and the lamp generator 140 may generate a reference signal RAMP for the operation of the readout circuit 150 based on the lamp control signal CTR_R. For example, the controller 130 may provide a column control signal CTR_Y to the readout circuit 150, and the readout circuit 150 may receive and process the pixel signals from the pixel array 110 through the column lines CLs based on the column control signal CTR_Y.

In some embodiments, the controller 130 may control the image sensor 100 as a whole based on the mode signal. Specifically, the controller 130 may receive a mode signal indicating an imaging mode from the application processor. For example, the application processor determines the imaging mode of the image sensor 100 according to various scenarios such as illuminance of an imaging environment, a user's resolution setting, a sensed or learned state, etc., and may provide the determined result to the controller 130 as a mode signal. The controller 130 may control the row control signal CTR_X, the column control signal CTR_Y, and the lamp control signal CTR_R) so that a plurality of pixels of the pixel array 110 output the pixel signal according to the imaging mode, the pixel array 110 may output the pixel signal for each of a plurality of pixels or the pixel signal for a part of a plurality of pixels based on the row control signal CTR_X and the column control signal CTR_Y, and the readout circuit 150 may sample and process the pixel signals received from the pixel array 110 based on the reference signal RAMP.

For example, in a high illuminance environment, the application processor may provide a mode signal MD indicating a full mode to the image sensor 100.

When receiving the mode signal MD indicating the full mode, the image sensor 100 controls the pixel array 110 to output the pixel signals generated by each of all pixels of the pixel array 110 and may individually process the output pixel signals. Meanwhile, one micro-lens is located on two phase-detection pixels PPX positioned adjacently, and light may be refracted and input to the phase-detection pixels PPX. Accordingly, the pixel signals output from the phase-detection pixels PPX may be different from the image signals output from the image sensing pixels IPX. To compensate for the difference between the pixel signals output from the phase-detection pixels PPX and the pixel signals output from the image sensing pixels IPX, the image sensor 100 may generate the image signal by using the pixel signal of the image sensing pixels IPX positioned adjacent to the phase-detection pixels PPX instead of the pixel signals output from the phase-detection pixels PPX.

In a low luminance environment, the application processor may provide a mode signal MD indicating a binning mode to the image sensor 100. When the mode signal MD indicating the binning mode is received, the image sensor 100 may control the pixel array 110 to output the pixel signals generated by the pixels adjacently positioned within the pixel array 110 or a predetermined number of identical color pixel units and process the output pixel signals.

The controller 130 may be implemented as a processing circuit such as hardware including a logic circuit or may be implemented as a combination of hardware and software, such as a processor executing software that performs a compression operation. Particularly, the controller 130 may be implemented as a central processing unit (CPU) included in the image sensor 100, an arithmetic logic unit (ALU) that performs a calculation and logical operation, a bit shift, and the like, a digital signal processor (DSP), a microprocessor, an application specific integrated circuit (ASIC), a control logic, and the like, however the present invention is not limited thereto, and an accelerator using as an assistant to an artificial neural network or the like, or an accelerator using the artificial neural network itself, a Neural Processing Unit (NPU), or the like may be further used.

The ramp signal generator 140 may generate a reference signal RAMP having a predetermined slope and including a plurality of ramp signals that gradually increase or decrease and provide it to the readout circuit 150.

Specifically, the ramp signal generator 140 may include a current source, a resistor, and a capacitor. The ramp signal generator 140 adjusts the current size of the variable current source or the resistance value of the variable resistor to adjust the ramp voltage, which is the voltage applied to the lamp resistor, so that a plurality of ramp signals decreasing or increasing with a slope determined according to the current size of the variable current source or the resistance value of the variable resistor may be generated. For example, the reference signal RAMP may have a waveform such that a constant voltage is maintained, lowered with a determined slope, and then returned to a constant voltage again.

The readout circuit 150 may convert the pixel signal (or the electric signal) from the pixels PX connected to the row line RL selected among a plurality of pixel PX according to the control from the controller 130 into a pixel value representing a light amount. The readout circuit 150 may process the pixel signal output through the corresponding column line CL and output it as image data IDAT. The readout circuit 150 may include a correlated double sampling (CDS) circuit 151, an analog-digital converter (ADC) circuit 153, and a buffer 155.

The correlated double sampling circuit 151 may include a plurality of comparators, and each comparator may compare the pixel signal received from the pixel array 110 through a plurality of column lines CL with a reference signal RAMP from the lamp generator 140. Specifically, the correlated double sampling circuit 151 may compare the received pixel signal with the reference signal RAMP and output the comparison result to the analog digital converter circuit 153.

A plurality of pixel signals output from a plurality of pixels PX may have a deviation die to a unique characteristic (e.g., a fixed pattern noise (FPN) etc.) of each pixel and/or a deviation due to a characteristic difference of the pixel circuit (e.g., transistors to output the charge stored in the photovoltaic device within the pixel) to output the pixel signals from the pixels PX. To compensate for a deviation between a plurality of pixel signals output through a plurality of column lines CL, to obtain a reset component (e.g., a reset voltage) and a sensing component (e.g., a sensing voltage) for the pixel signal and to extract the difference (e.g., a difference between the reset voltage and the sensing voltage) as a valid signal component is referred to as a correlated double sampling. The correlated double sampling circuit 151 may output a comparison result to which the correlated double sampling technique is applied to the received pixel signal.

The analog digital converter circuit 153 may convert the comparison result of the correlated double sampling circuit 151 into digital data, thereby generating and outputting the pixel values corresponding to a plurality of pixels in a row unit. The analog digital converter circuit 153 may include a plurality of counters. The counter may be implemented as an up-counter and calculation circuit, or an up/down counter, or a bit-wise inversion counter, in which the count value sequentially increases based on the counting clock signal. A plurality of counters may be connected to the output of each of a plurality of comparators. Each of a plurality of counters may count a comparison result output from a corresponding comparator and output the digital data (e.g., the pixel value) according to the counting result.

The buffer 155 may store each pixel value output from the analog digital converter circuit 153. The buffer 155 may store the digital data for each row. In some embodiments, the buffer 155 may temporarily store a plurality of digital data output from the counter, and then amplify and output it. That is, the buffer 155 may be an output buffer. The buffer 155 may output the image data DAT amplified based on the column control signal CTR_Y of the controller 130 to the outside.

The buffer 155 may be implemented as an SRAM (static random access memory), a latch, a flipflop, or a combination thereof, but is not limited thereto. In an exemplary embodiment, the buffer 155 may be included in the analog digital converter circuit 153 as a memory.

In some embodiments, the image sensor 100 may support an auto focusing (AF) detection function. The image sensor 100 may perform the automatic focusing detection using phase difference AF technology. The phase difference AF is a method of focusing on the object OBJECT by detecting a disparity of the phases of the images formed on the image sensor 100. Specifically, the CDS circuit 151 may receive a phase signal from the pixel array 110 and perform a phase difference operation. For example, the CDS circuit 151 may obtain a focus position, a focus direction, or a distance between the object OBJECT and the image sensor 100 by performing the correlated double sampling operation on the phase signal received from the phase-detection pixels PPX. Thereafter, the controller 130 may output a control signal for moving the position of the lens LS based on the correlated double sampling operation result.

Figure 2:
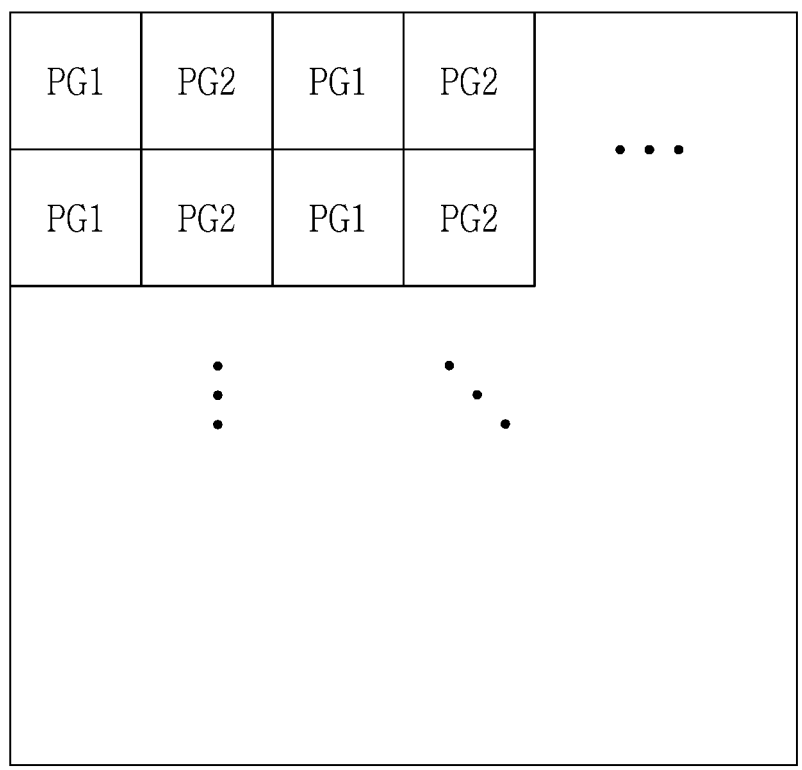
FIG. 2 and FIG. 3 are top plan views showing a pixel arrangement of a pixel array according to an embodiment.
Figure 3:
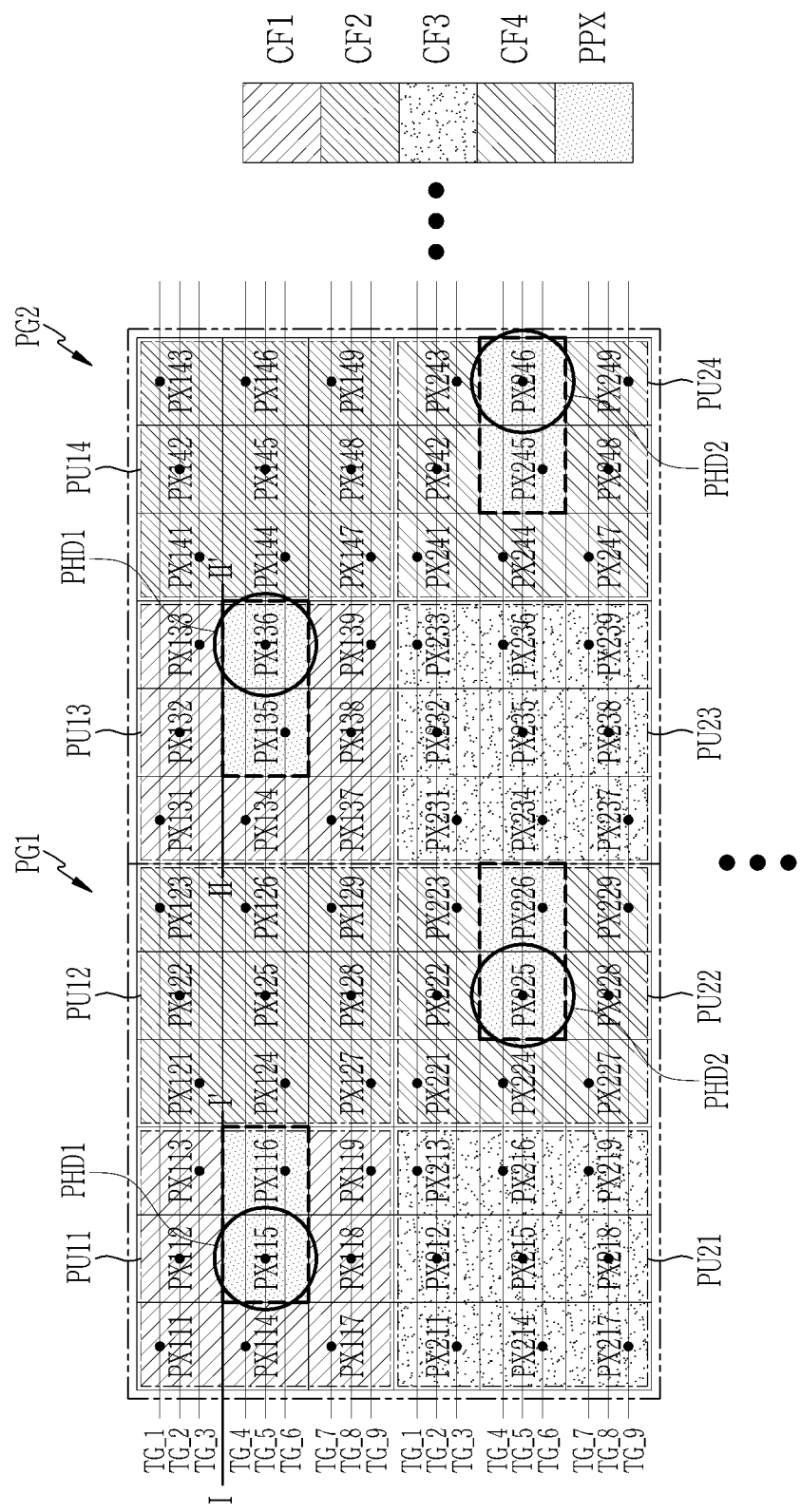

FIG. 2 and FIG. 3 are top plan views showing a pixel arrangement of a pixel array according to an embodiment.

As shown in FIG. 2, the pixel array 110 may include a plurality of first pixel groups PG1 and a plurality of second pixel groups PG2 repeatedly located on the substrate of the image sensor 100 along the X-axis.

A plurality of first pixel groups PG1 may be located in the first column, a plurality of second pixel groups PG2 may be located in the second column, and a plurality of first pixel groups PG1 may be located in the third column. That is, the same pixel group PG1 or PG2 may be located in the column direction, and different pixel groups may be alternately located in the row direction. The first pixel group PG1 and the second pixel group PG2 may be repeatedly arranged along the column direction.

In FIG. 2, it is described that the first pixel group PG1 is located in the first column, but the present disclosure is not limited thereto, and the second pixel group PG2 may be located.

FIG. 3 is a view showing a pixel arrangement in a first pixel group PG1 and a second pixel group PG2.

One pixel group PG1 or PG2 may include a plurality of pixel units. A plurality of pixel units may be located in a form of A×B (here, A and B are both arbitrary natural numbers). Hereinafter, it is described that one pixel group includes four pixel units, and the four pixel units in one pixel group are located in a 2×2 form. For example, the first pixel group PG1 may include 2×2 pixel units PU11, PU12, PU21, and PU22. Also, the second pixel group PG2 may include 2×2 pixel units PU13, PU14, PU23, and PU24.

The same color filter may be formed on one pixel unit. That is, one pixel unit may include the pixels for outputting information related to one color. For example, the first color filter CF1 may be formed on the pixel unit PU11, the second color filter CF2 may be formed on the pixel unit PU12, the third color filter CF3 may be formed on the pixel unit PU21, and the fourth color filter CF4 may be formed on the pixel unit PU22. The first color filter CF1 may transmit green light Gr, the second color filter CF2 may transmit red light R, the third color filter CF3 may transmit blue light B, and the fourth color filter CF4 may transmit green light Gb. The pixel unit in which the first color filter CF1 is formed is referred to as a first green pixel unit, the pixel unit in which the second color filter CF2 is formed is referred to as a red pixel unit, and the pixel unit in which the third color filter CF3 is formed is referred to as a blue pixel. It is referred to as a unit, and the pixel unit in which the fourth color filter CF4 is formed is referred to as a second green pixel unit.

A plurality of pixel units PU11, PU12, PU21, and PU22 or PU13, PU14, PU23, and PU24 may be arranged with a Bayer pattern in one pixel group PG1 or PG2. In the present disclosure, as one implementation of the Bayer pattern for better understanding and ease of description, it has been exemplified that the red pixel unit is located on the right side of the first green pixel unit, the blue pixel unit is located below the first green pixel unit, and the second green pixel unit is located on the diagonal side of the first green pixel unit, respectively, however the technical idea of the present disclosure is not limited thereto, and the positions of red, green, and blue pixel units may be swapped, a white pixel unit may be located instead of any one of two green pixel units, or it will be understood that it may be combined with other color configurations such as a yellow pixel unit and a cyan pixel unit.

One pixel unit may include 3×3 sub-pixels that are located along the X-axis and the Y-axis. For example, the pixel unit PU11 may include 3×3 sub-pixels PX111-PX119 that are located along the X-axis and the Y-axis. Each sub-pixel PX111-PX119 may include a photovoltaic device.

In the present disclosure, for better understanding and ease of description, although nine sub-pixels arranged in a 3×3 form are exemplified, it is not limited thereto, and the pixel unit may include the sub-pixels arranged in various numbers of combinations (e.g., in a form of m×n, where m and n are both arbitrary natural numbers). One pixel group may include a plurality of phase detection cells PPX. The plurality of phase detection cells PPX may be positioned in one pixel unit. A plurality of phase-detection pixels PPX may be positioned adjacent to each other left and right or vertically adjacent to each other. In FIG. 2, the phase-detection pixels PPX arranged adjacent to each other are shown, but the present disclosure is not limited thereto and may include a plurality of phase-detection pixels having various geometric structures, such as a plurality of phase-detection pixels arranged vertically adjacently or a plurality of phase-detection pixels arranged diagonally adjacently.

For example, one pixel unit PU11 may include a plurality of phase-detection pixels PX115 and PX116 arranged adjacent to each other left and right, and one pixel unit PU13 may include a plurality of phase-detection pixels PX135 and PX136 arranged adjacent to each other left and right. A ratio of the number of phase-detection pixels PPX to the number of a plurality of sub-pixels located in the pixel array 110 may be 1/9.

The phase-detection pixels included in two adjacent pixel groups PG1 and PG2, respectively, form a pair and be used to calculate the distance from the object OBJECT. in some embodiments, the phase detection pixel PX115 located at the left among two phase-detection pixels located at the left and right in the first pixel unit PU11 in one pixel group PG1 and the phase detection pixel PX136 located at the right among two phase-detection pixels located at the left and right in the first pixel unit PU13 in the pixel group PG2 positioned adjacent to the pixel group PG1 may constitute a pair of phase-detection pixels PHD1. Similarly, the sub-pixel PX225 and the sub-pixel PX246 may constitute a pair of phase-detection pixels PHD2.

The image sensor 100 may calculate the distance from the object OBJECT based on the pixel signal difference of a pair of phase-detection pixels PHD1 and PHD2 and may detect the focus of the object OBJECT based on the calculated distance. For example, among a pair of phase-detection pixels PHD1 and PHD2, the first phase-detection pixels PX115 and PX225 may sense the left side image for the object OBJECT, and the second phase-detection pixels PX136 and PX246 may sense the right-side image for the object OBJECT. Each of the first and second phase-detection pixels of a pair of phase-detection pixels PHD1 and PHD2 may be positioned in different pixel groups PG1 and PG2. The image sensor 100 may perform phase detection for the object OBJECT by calculating a disparity between the phase signals of a pair of phase-detection pixels PHD1 and PHD2.

A pair of phase-detection pixels is described with reference to FIG. 4.

Figure 4:
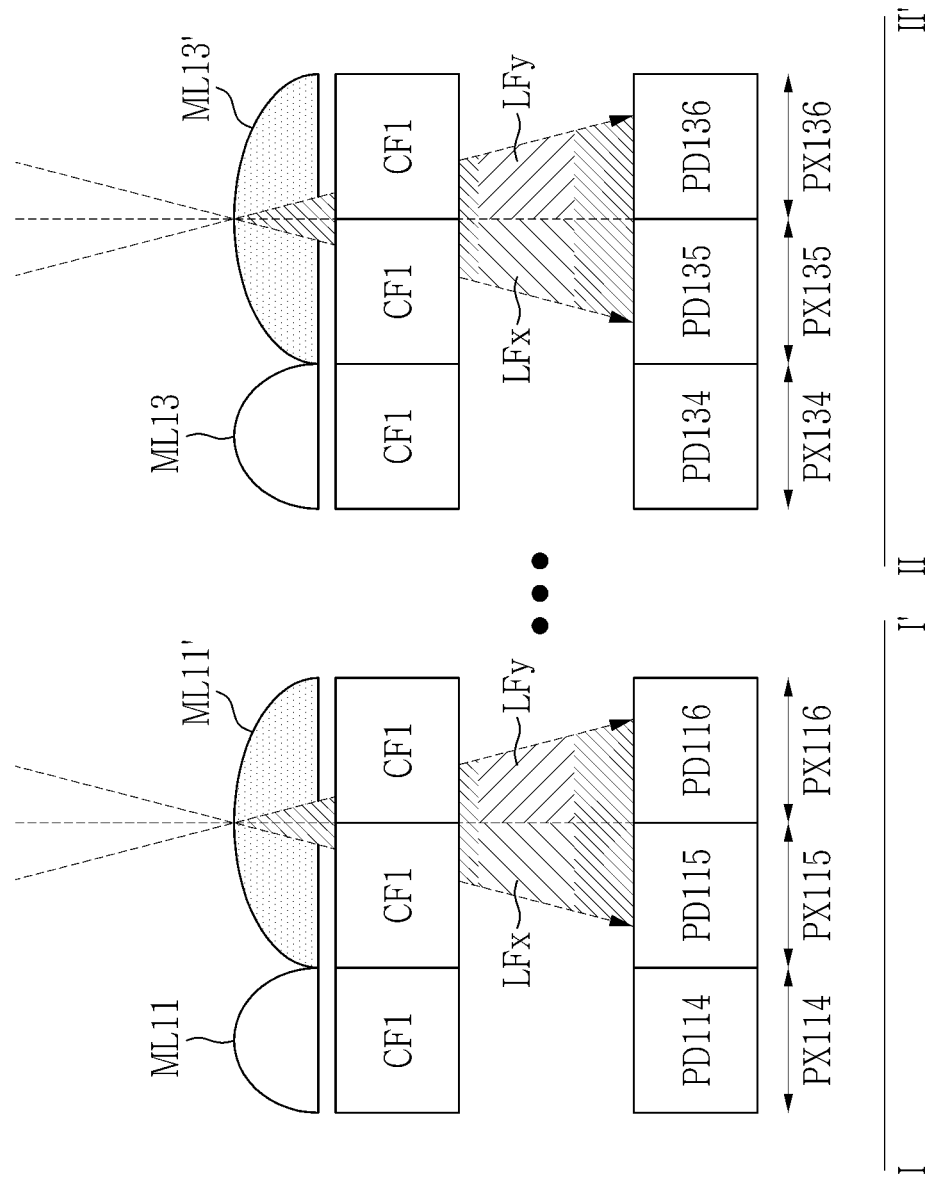
FIG. 4 is a cross-sectional view of a pixel array of FIG. 3 taken along lines I-I' and II-II'.

FIG. 4 is a cross-section view of a pixel array of FIG. 3 taken along lines I-I' and II-II'. FIG. 4 shows a pair of phase-detection pixels PHD1 and this may be also similar to the cross-section view of a pair of phase-detection pixels PHD2.

Each of a plurality of pixels PX may include a micro lens, a photodiode, and a color filter. A micro lens may be provided above the color filter. According to an exemplary embodiment, the vertical cross-section shape of the micro lens may be an arc having a circular curvature or a part of an ellipse.

Specifically, the sub-pixel PX114 may include one color filter CF1 and one micro lens ML11 located on the photodiode PD114. Light incident to the center of the micro lens ML11 passes through the color filter CF1, so only light of a specific wavelength band (e.g., 500-600 nm corresponding to a green color) is transmitted, and the transmitted light of the specific wavelength band is imaged on the photodiode PD114. As such, when light incident on one micro lens ML11 is imaged on one photodiode PD114, it may be referred to as a single-photodiode (Single-PD). Similar to the sub-pixel PX114, in the sub-pixel PX134, light incident on one micro lens ML13 may be imaged on one photodiode PD134. Also, although not shown in FIG. 4, the sub-pixels PX124, PX125, and PX126 that are not the phase-detection pixels PPX may also be single photodiodes.

The color filter CF1 may be located on the photodiode PD115 of the sub-pixel PX115 and the photodiode PD116 of the sub-pixel PX116, and one micro lens ML11' may be located on the photodiodes PD115 and PD116. That is, two color filters CF1 and two photodiodes PD115 and PD116 may be provided under one micro lens ML11', respectively. The light incident to the center of the micro lens ML11' is refracted, and the first beam (LFx), which is a part of the incident light, passes through the color filter CF1 and may be imaged on the photodiode PD115, and the second beam LFy, which is the rest of the incident light, may pass through the color filter CF1 and be imaged on the photodiode PD116. As such, when light incident on one micro lens ML11' is imaged on two photodiodes (PD115 and PD116), it may be referred to as a dual-photodiode (Dual-PD). The sub-pixels PX135 and PX136, which are other phase-detection pixels PPX, may also be dual photodiodes.

The sub-pixel PX115 may be the first phase detection pixel, and the sub-pixel PX136 may be the second phase detection pixel. That is, the sub-pixel PX115 may sense the left image of the object, and the sub-pixel PX136 may sense the right image of the object. The image sensor 100 may perform the phase detection for the object OBJECT by calculating the disparity according to the phase difference based on the charge of the photodiodes PD115 and PD136 of a pair of phase-detection pixels, thereby acquiring the images with the different phases for the same object OBJECT.

Figure 5:
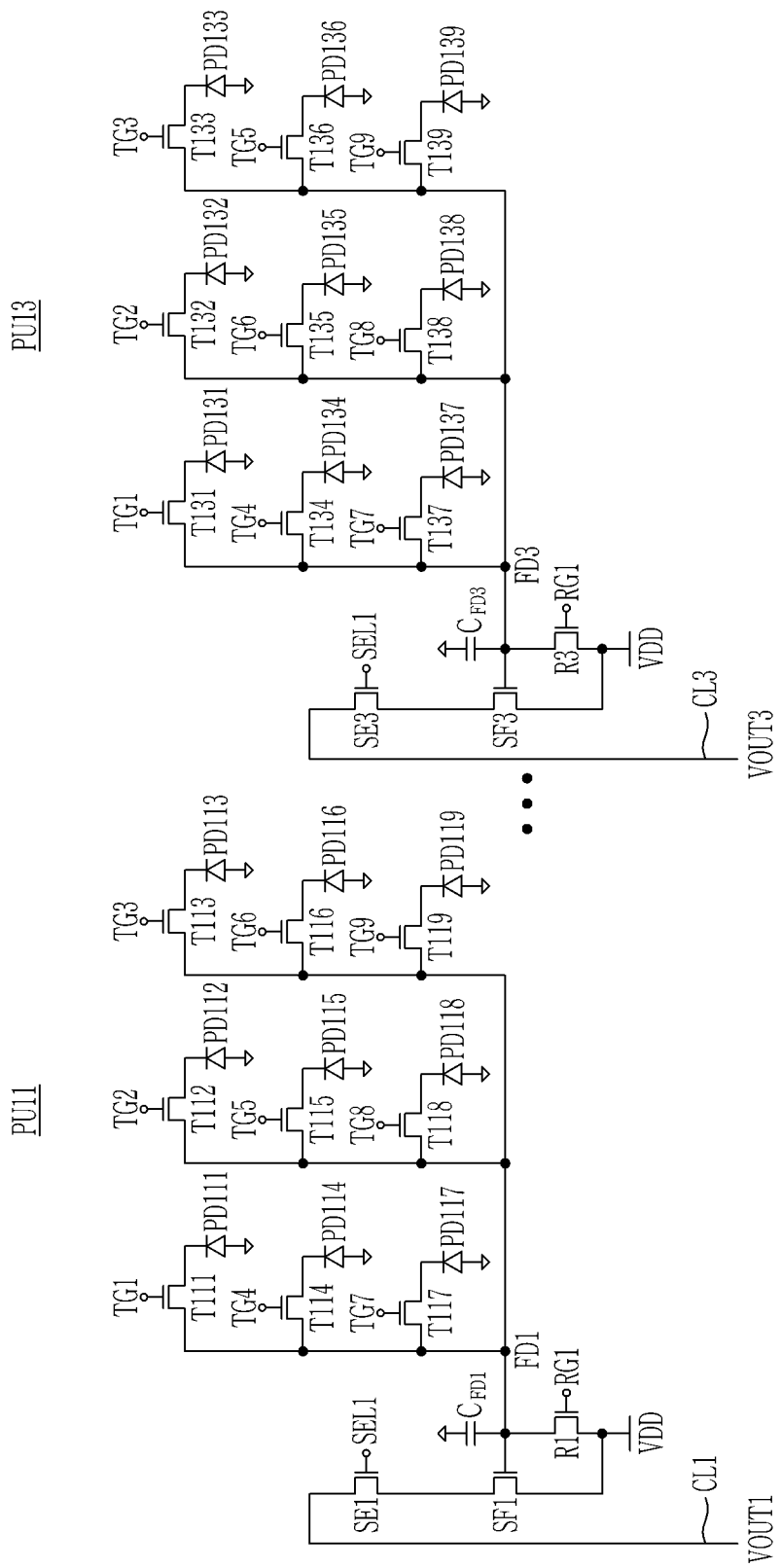
FIG. 5 is a circuit diagram showing a pixel unit according to an embodiment.

FIG. 5 is a circuit diagram showing a pixel unit according to an embodiment.

Illustratively, FIG. 5 is a circuit diagram of the pixel unit PU11 and the pixel unit PU13 shown in FIG. 2.

The pixel unit PU11 and the pixel unit PU13 may each be a first green pixel unit including a phase detection pixel. Meanwhile, the pixel units having the same color filter may have a similar structure in all pixel groups.

The sub-pixels of each pixel unit may share the same floating diffusion region. For example, the pixel unit PU11 may include the sub-pixels PX111-PX119, and the sub-pixels PX111-PX119 of the pixel unit PU11 may share the same floating diffusion region FD1.

The pixel unit PU11 may include the photovoltaic devices PD111-PD119, a reset transistor R1, a driving transistor SF1, and a selection transistor SE1.

The sub-pixel PX111 may include the photovoltaic device PD111 and the transmission transistor T111. The sub-pixel PX112 may include the photovoltaic device PD112 and the transmission transistor T112, the sub-pixel PX113 may include the photovoltaic device PD113 and the transmission transistor T113, the sub-pixel PX114 may include the photovoltaic device PD114 and the transmission transistor T114, and the sub-pixel PX115 may include the photovoltaic device PD115 and the transmission transistor T115. Additionally, the sub-pixel PX116 may include the photovoltaic device PD116 and the transmission transistor T116, the sub-pixel PX117 may include the photovoltaic device PD117 and the transmission transistor T117, the sub-pixel PX118 may include the photovoltaic device PD118 and the transmission transistor T118, and the sub-pixel PX119 may include the photovoltaic device PD119 and the transmission transistor T119. The sub-pixel PX111-PX119 may share the reset transistor R1, the driving transistor SF1, and the selection transistor SE1.

The reset transistor R1 may be turned on by the reset signal RG1 to provide a reset voltage (e.g., a power source voltage VDD) to the first floating diffusion region FD1. The first floating diffusion region FD1 may accumulate the charges converted by at least one of the photovoltaic devices PD111-PD119. For example, the capacitance of the first floating diffusion region FD1 is shown as the first capacitance CFD1. The first floating diffusion region FD1 may be connected to a gate terminal of the driving transistor SF1 operating as a source follower amplifier. As a result, a voltage potential corresponding to the charge accumulated in the first floating diffusion region FD1 may be formed.

The driving transistor SF1 may amplify the change in the charge of the first floating diffusion region FD1 and generate a voltage (i.e., a pixel signal VOUT1) corresponding thereto.

The selection transistor SE1 may be driven by the selection signal SEL1 to select a pixel unit to be read as a row unit. As the selection transistor SE1 is turned on, the pixel signal VOUT1 may be output to the readout circuit 150 through the column line CL1.

The transmission transistors T111-T119 may transmit the charges generated by the photovoltaic devices PD111-PD119 to the first floating diffusion region FD1. One end of the transmission transistors T111-T119 may be connected to the photovoltaic devices PD111-PD119, respectively, and the other ends may be commonly connected to the first floating diffusion region FD1. For example, during a period in which the transmission transistor T111 is turned on by the transmission signal TG1 received from the row driver 120, the charges provided from the photovoltaic device PD111 may be accumulated in the first floating diffusion region FD1. By operating the transmission transistors T112-T119 in a similar manner, the charges provided from the photovoltaic devices PD112-PD119 may be similarly accumulated in the first floating diffusion region FD1.

Meanwhile, the pixel unit PU13 may include the sub-pixels PX131-PX139, and the sub-pixels PX131-PX139 of the pixel unit PU13 may share the same floating diffusion region FD3. The pixel unit PU13 may include the photovoltaic devices PD131-PD139, a reset transistor R3, a driving transistor SF3, and a selection transistor SE3.

The sub-pixel PX131 may include a photovoltaic device PD131 and a transmission transistor T131. The sub-pixel PX132 may include a photovoltaic device PD132 and a transmission transistor T132, the sub-pixel PX133 may include a photovoltaic device PD133 and a transmission transistor T133, the sub-pixel PX134 may include a photovoltaic device PD134 and a transmission transistor T134, and the sub-pixel PX135 may include a photovoltaic device PD135 and a transmission transistor T135. Also, the sub-pixel PX136 may include a photovoltaic device PD136 and a transmission transistor T136, the sub-pixel PX137 may include a photovoltaic device PD137 and a transmission transistor T137, the sub-pixel PX138 may include a photovoltaic device PD138 and a transmission transistor T138, and the sub-pixel PX139 may include a photovoltaic device PD139 and a transmission transistor T139. The sub-pixels PX131-PX139 may share the reset transistor R3, the driving transistor SF3, and the selection transistor SE3.

The reset transistor R3 may be turned on by the reset signal RG1 to provide a reset voltage (e.g., a power source voltage VDD) to the third floating diffusion region FD3. The third floating diffusion region FD3 may accumulate the charges converted by at least one of the photovoltaic devices PD131-PD139. As an example, the capacitance of the third floating diffusion region FD3 is shown as a third capacitance CFD3. The third floating diffusion region FD3 may be connected to the gate terminal of the driving transistor SF3 operating as a source follower amplifier. As a result, a voltage potential corresponding to the charge accumulated in the third floating diffusion region FD3 may be formed.

The driving transistor SF3 may amplify a change in the charge of the third floating diffusion region FD3 and generate a voltage (i.e., a pixel signal VOUT3) corresponding thereto. The selection transistor SE3 may be driven by the selection signal SEL1 to select the pixel to be read by a row unit. As the selection transistor SE3 is turned on, the pixel signal VOUT3 may be output to the readout circuit 150 through the column line CL3.

The transmission transistors T131-T139 may transfer the charges generated by the photovoltaic devices PD131-PD139 to the third floating diffusion region FD3. One of ends of the transmission transistors T131-T139 may be respectively connected to the photovoltaic devices PD131-PD139, and the other ends may be commonly connected to the third floating diffusion region FD3.

In some embodiments, the sub-pixels other than the phase-detection pixels PX115, PX116, PX135, PX136, PX225, PX226, PX245, and PX246 may be controlled by the same transmission signal for the pixels arranged in the corresponding positions in the pixel group. For example, the sub-pixels PX111, PX131; PX123, PX143; PX213, PX233, etc. in the pixel groups PG1 and PG2 may be controlled by the same transmission signal, for example, the first transmission signal TG1.

A pair of phase-detection pixels PHD may be controlled by the same transmission signal. Specifically, the first phase-detection pixels (e.g., the sub-pixels PX115 and PX225) and the second phase-detection pixels (e.g., the sub-pixels PX136 and PX246) are controlled by one transmission signal, for example the fifth transmission signal TG5.

When the controller 130 operates in a full mode, the pixel signals output from each sub-pixel PX111-PX119 and PX131-PX139 constituting the pixel unit may be used individually. That is, as the controller 130 controls each of the transmission signals TG1-TG9 so that each of the transmission transistors T111-T119 and T131-T139 is turned on at different timing, the pixel signals VOUT1 and VOUT3 corresponding to the charges converted by each photovoltaic device may be output at different timings through the column lines CL1 and CL3.

When the controller 130 operates in the binning mode, the charges converted by each sub-pixel PX111-PX119 and PX131-PX139 constituting the pixel unit may be used to generate one pixel signal VOUT1 and VOUT3. For example, the transmission transistors T111-T119 are turned on simultaneously or at different timing, so that the charges converted by sub-pixels PX111-PX119 may be accumulated in the first floating diffusion region FD1, and the transmission transistors T131-T139 are turned on simultaneously or at different timing, so that the charges converted by the sub-pixels PX131-PX139 may be accumulated in the third floating diffusion region FD3. Thereafter, the pixel signal VOUT1 corresponding to the charges accumulated in the first floating diffusion region FD1 and the pixel signal VOUT3 corresponding to the charges accumulated in the third floating diffusion region FD3 can be output to the readout circuit 150 through the column line CL3.

Figure 6:
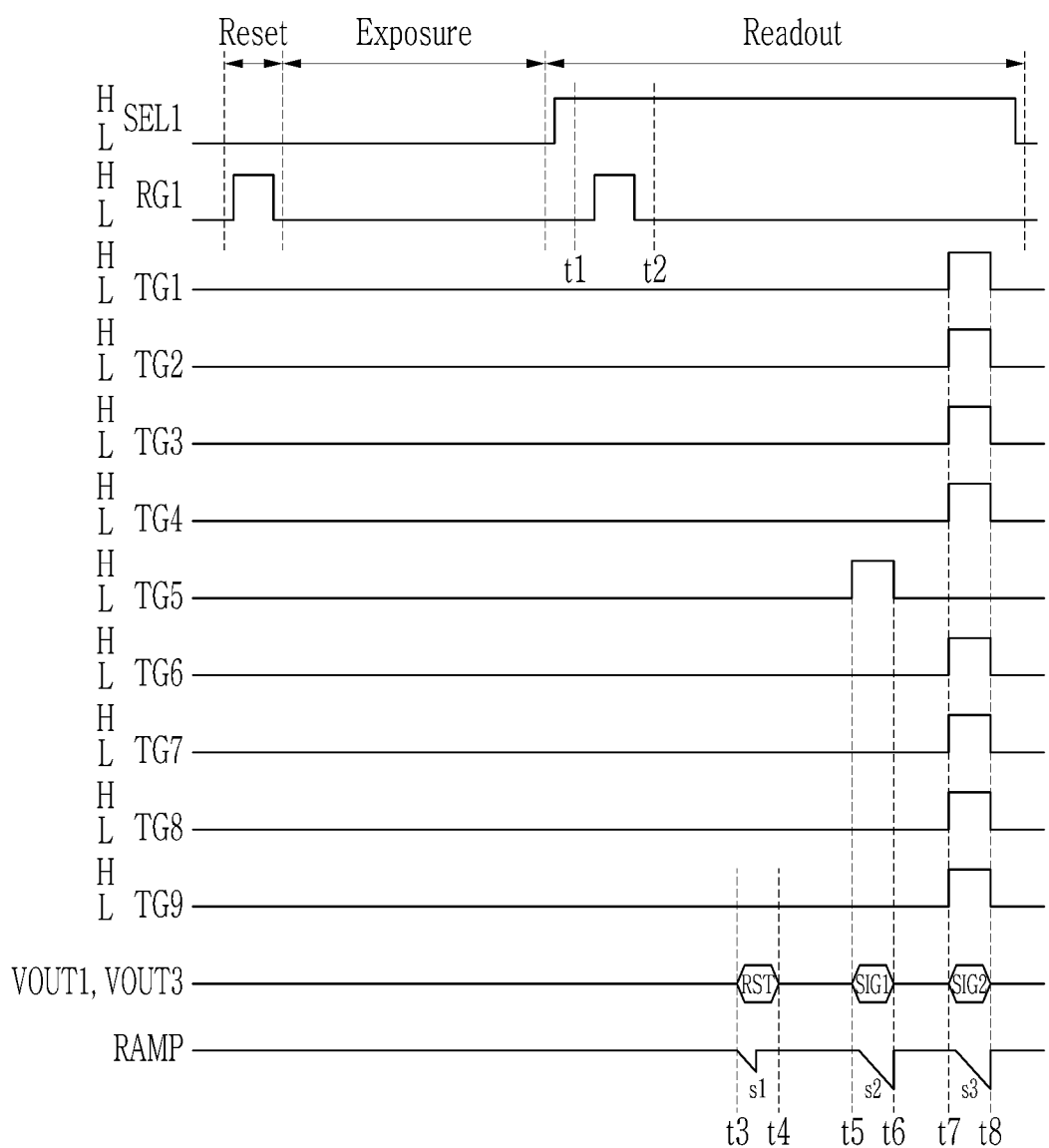
FIG. 6 is a timing diagram for explaining a transmission control signal provided to a pixel array according to an embodiment.

FIG. 6 is a timing diagram for explaining a transmission control signal provided to a pixel array according to an embodiment.

Specifically, FIG. 6 is a timing diagram showing the operation timing of the image sensor when the controller 130 operates in the binning mode.

In FIG. 6, a scan period for driving a plurality of pixels is shown by a unit of a pixel unit. One scan period may sequentially include a reset period Reset, an exposure period Exposure, and a readout period Readout.

In the reset period Reset, as the reset signal RG1 transitions to a high level H, the reset transistors R1 and R3 are turned on. Accordingly, the charge accumulated in the first floating diffusion region FD1 and the third floating diffusion region FD3 moves to the power source voltage terminal VDD, and the voltage in the first floating diffusion region FD1 and the third floating diffusion region FD3 may be reset to the power source voltage VDD.

Next, the charge is accumulated in each photovoltaic device PD111-PD119 and PD131-PD139 during the exposure period Exposure.

Finally, the readout period Readout is a period in which the charge accumulated in each photovoltaic device PD111-PD119 and PD131-PD139 is output to the readout circuit 150.

During the readout period Readout, the selection signal SEL1 is transitioned to a high level H, and the pixel units positioned in one row may be selected. Specifically, the selection transistors SE1 and SE3 are turned on by the selection signal SEL1.

At t1, the reset signal RG1 may be transitioned to a high level H, so that the reset transistors R1 and R3 may be turned on in the period t1-t2. Then, the first floating diffusion region FD1 and the third floating diffusion region FD3 are connected to the power source voltage VDD.

Thereafter, the pixel signals VOUT1 and VOUT3 output from the pixel units PU11 and PU13 selected in the section t3-t4 may include a reset pixel signal RST.

Figure 7:
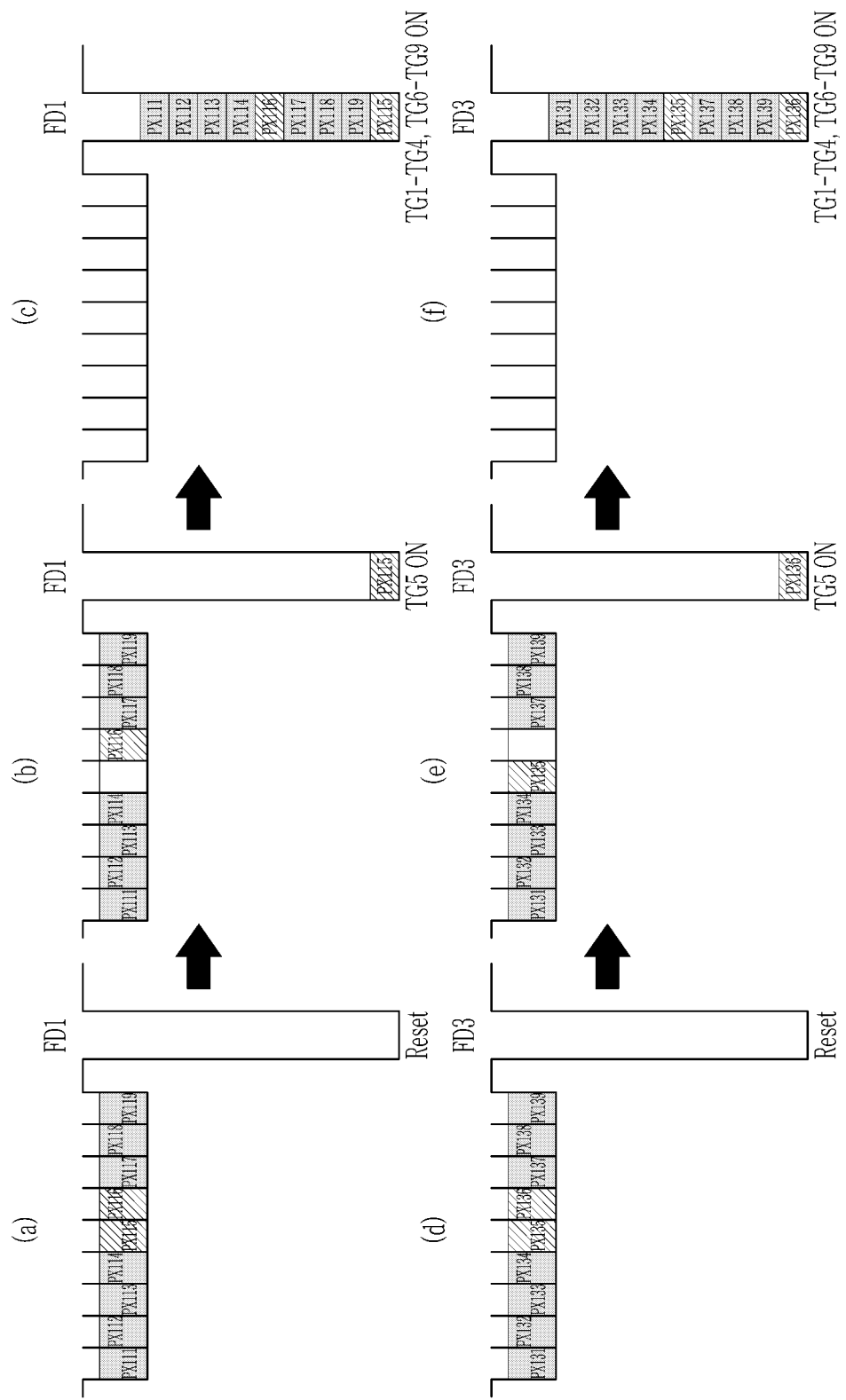
FIG. 7 is a view schematically showing a charge accumulated in a floating diffusion region in a readout period.

It is referred to through FIG. 7 together. FIG. 7 is a diagram view showing a charge accumulated in a floating diffusion region in a readout period. Specifically, FIGS. 7(*a*), (*b*), and (*c*) are the views schematically showing the charges accumulated in the first floating diffusion region FD1, and FIGS. 7(*d*), (*e*), and (*f*) are the views schematically showing the charges accumulated in the third floating diffusion region FD3.

FIG. 7(*a*) shows the charge and the first floating diffusion region FD1 in the sub-pixels PX111-PX119 of the section t3-t4, and FIG. 7(*d*) shows the charge and the third floating diffusion region FD3 in the sub-pixels PX131-PX139 of the section t3-t4. As shown in FIGS. 7(*a*) and (*d*), the first floating diffusion region FD1 and the third floating diffusion region FD3 are connected to the power source voltage VDD to be reset, so that no charges are accumulated.

Again, referring to FIG. 6, the reference signal RAMP is generated by the ramp signal generator 140 and is a signal provided to the CDS circuit 151 in the readout circuit 150 during the readout period Readout. The waveform of the reference signal RAMP may be determined according to types of the pixel signal generated during the readout period Readout. For example, if the reset pixel signal RST is output from the pixel array 110, the ramp signal generator 140 may output the reset reference signal s1. Also, if the image signals SIG1 and SIG2 are output from the pixel array 110, the ramp signal generator 140 may output set signals s2 and s3.

In the section t3-t4, the ramp signal generator 140 may output the reset reference signal s1. The CDS circuit 151 may receive the pixel signal VOUT1 and the pixel signal VOUT3 from the pixel array 110, and the reset reference signal s1 from the ramp signal generator 140, to be compared.

In the section t5-t6, the fifth transmission signal TG5 is transitioned to the high level H. During the section in which the fifth transmission signal TG5 is the high level H, the transmission transistor T115 and the transmission transistor T136 are turned on, so that the charges provided from each of the photovoltaic device PD115 and the photovoltaic device PD136 may be accumulated in the first floating diffusion region FD1 and the third floating diffusion region FD3. The charge accumulated in the first floating diffusion region FD1 may be output to the pixel signal VOUT1 through the driving transistor SF1, and the charge accumulated in the third floating diffusion region FD3 may be output to the pixel signal VOUT3 through the driving transistor SF3. That is, the phase signal of a pair of phase-detection pixels PHD may be output from the pixel array 110.

FIG. 7(B) shows the charge and the first floating diffusion region FD1 in the sub-pixel PX111-PX119 of the section t5-t6, and FIG. 7(E) shows the charge and the third floating diffusion region FD3 in the sub-pixels PX131-PX139 of the section t5-t6.

The charge from the photovoltaic device PD115 of the first phase detection pixel, that is, the sub-pixel PX115, may be accumulated in the first floating diffusion region FD1, and the charge from the photovoltaic device PD136 of the second phase detection pixel, that is, the sub-pixel PX136, may be accumulated in the third floating diffusion region FD3.

In the section t5-t6, the ramp signal generator 140 may output the set signal s2. The CDS circuit 151 may receive the pixel signal VOUT1 and the pixel signal VOUT3 from the pixel array 110 and the set signal s2 from the ramp signal generator 140 and compare them. In detail, the CDS circuit 151 calculates the phase difference based on the charge of the photovoltaic device PD115 included in the pixel signal VOUT1 and the charge of the photovoltaic device PD136 included in the pixel signal VOUT3 to derive the phase information for the object OBJECT. In detail, the charge of the photovoltaic device PD115 may correspond to the left image of the object OBJECT and the charge of the photovoltaic device PD136 may correspond to the right image of the object OBJECT. For example, the CDS circuit 151 may perform the correlated double sampling calculation for the phase signal from the phase detection pixel PX115 and PX136 to derive the phase information for the object OBJECT. In this case, the phase information extracted from a pair of phase-detection pixels PHD1 may include the right/left disparity for the object OBJECT. The controller 130 may adjust the focus in the left/right direction for the object OBJECT by using the phase information extracted by the CDS circuit 151.

Again, referring to FIG. 6, in the section t7-t8, the rest of the transmission signals TG1-TG4 and TG6-TG9 are all transitioned to a high level H. In this section, the rest of the transmission transistors T111-T114 and T116-T119 in the pixel unit PU11 and the rest of the transmission transistors T131-T135 and T137-T139 in the pixel unit PU13 may all be turned on. Accordingly, the charges provided from each photovoltaic device PD111-PD114 and PD116-PD119 may be accumulated in the first floating diffusion region FD1, and the charges provided from each photovoltaic device PD131-PD135 and PD137-PD139 may be accumulated in the third floating diffusion region FD3.

Accordingly, the charges provided from all photovoltaic devices PD111-PD119 positioned in the pixel unit PU11 may be accumulated in the first floating diffusion region FD1 and the charges provided from all photovoltaic devices PD131-PD139 positioned in the pixel unit PU13 may be accumulated in the third floating diffusion region FD3.

FIG. 7(*c*) shows the charge and the floating diffusion region FD1 in the sub-pixel PX111-PX119 of the section t7-t8, and FIG. 7(*f*) shows the charge and the floating diffusion region FD3 in the sub-pixels PX131-PX139 of the section t7-t8.

The charge from the photovoltaic devices PD111-PD119 of the sub-pixels PX111-PX119 may be accumulated in the first floating diffusion region FD1, and the charges from the photovoltaic devices PD131-PD139 of the sub-pixels PX131-PX139 may be accumulated in the third floating diffusion region FD3.

In the section t7-t8, the ramp signal generator 140 may output the set signal s3. The CDS circuit 151 may receive the pixel signal VOUT1 and the pixel signal VOUT3 from the pixel array 110, and the set signal s3 from the ramp signal generator 140 and compare them. In detail, the CDS circuit 151 may derive the image information for the object OBJECT based on the charge of the photovoltaic devices PD111-PD119 included in the pixel signal VOUT1 and the charge of the photovoltaic devices PD131-PD139 included in the pixel signal VOUT3.

In summary, the first phase detection pixel and the second phase detection pixel included in a pair of phase-detection pixels are located in a separate pixel group and a separate pixel unit, and a pair of phase-detection pixels may be located to be controlled by the same transmission control signal. Also, the image sensor 100 may generate the correct phase information by reading the charges of the rest of the sub-pixels after first reading the charges of a pair of phase detection pixel. In this case, the sub-pixels in one pixel unit may share one floating diffusion.

Meanwhile, since one microlens is located on two phase-detection pixels PPX positioned adjacently, light may be refracted and input to each phase-detection pixels PPX. When two phase-detection pixels are positioned adjacent to each other, the first phase detection pixel generates the first phase signal by sensing the left image of the object OBJECT, and the second phase detection pixel may generate the second phase signal by sensing the right image of the object OBJECT.

For example, it is assumed that an amount of light 20 is incident on two phase-detection pixels PPX. The incident light passes through one microlens and is separated into two light fluxes LFx and LFy to be imaged on the photodiode of two-phase-detection pixels PPX. For example, the size of the first phase signal passing through the first phase detection pixel may correspond to the amount of light of 5, and the size of the second phase signal passing through the second phase detection pixel may correspond to the amount of light of 15. Since the light flux is not equally separated in two phase-detection pixels PPX by the microlens, the pixel signal corresponding to the correct amount of light cannot be output with each of the phase-detection pixels PPX, therefore, when the image sensor operates in the binning mode, the pixel signal generated by the sum of the charges converted by the image sensing pixels IPX and the charges converted by the phase-detection pixels PPX may be different from the pixel signal generated the sum of the charges converted by the image sensing pixels IPX. However, since the sum of the size of the first phase signal and the size of the second phase signal may correspond to the light amount of 20, when two phase-detection pixels PPX are used together, the pixel signal corresponding to the accurate light amount may be output.

A conventional image sensor generates phase information based on a phase signal from two phase-detection pixels PPX positioned adjacently on different floating diffusions (i.e., different pixel units). That is, one phase-detection pixel PPX exists on one pixel unit. As described above, the pixel signal generated by the charge converted by one phase detection pixel PPX may be different from the pixel signal generated by the charge converted by the image sensing pixel IPX. Accordingly, in order to generate one pixel signal from one pixel unit, the charge converted from the phase-detection pixels PPX could not be used together with the charge converted by the image sensing pixels IPX and did not contribute to the actual sensitivity. Therefore, the conventional image sensor is able to generate an image signal corresponding to the object OBJECT by using the remaining sub-pixels except for one phase detection pixel.

However, according to the image sensor 100 of the present embodiment, two phase-detection pixels PPX may be positioned on one floating diffusion (i.e., one pixel unit). That is, both phase-detection pixels PPX may exist on one pixel unit. Unlike the conventional image sensor, the image sensor 100 of the present embodiment may use the sum of the charges converted by two phase-detection pixels PPX in the binning mode. That is, the image sensor 100 may use all pixels in the pixel array 110 to sense the image by first reading the phase signal from the phase-detection pixels PPX during the readout operation and then reading the image signal from the remaining image sensing pixels IPX. Accordingly, the image sensor 100 may generate the image signal with increased sensitivity than the conventional image sensor.

The question is how to arrange the phase-detection pixels PPX on the pixel array 110. Locating too many phase-detection pixels PPX on the pixel array 110 reduces the number of image sensing pixels IPX and causes resolution degradation. Locating too few phase-detection pixels PPX makes accurate phase difference detection impossible. Various arrangements of the phase-detection pixels PPX are described with reference to FIG. 8 to FIG. 9 and FIGS. 11 to 16.

Figure 8:
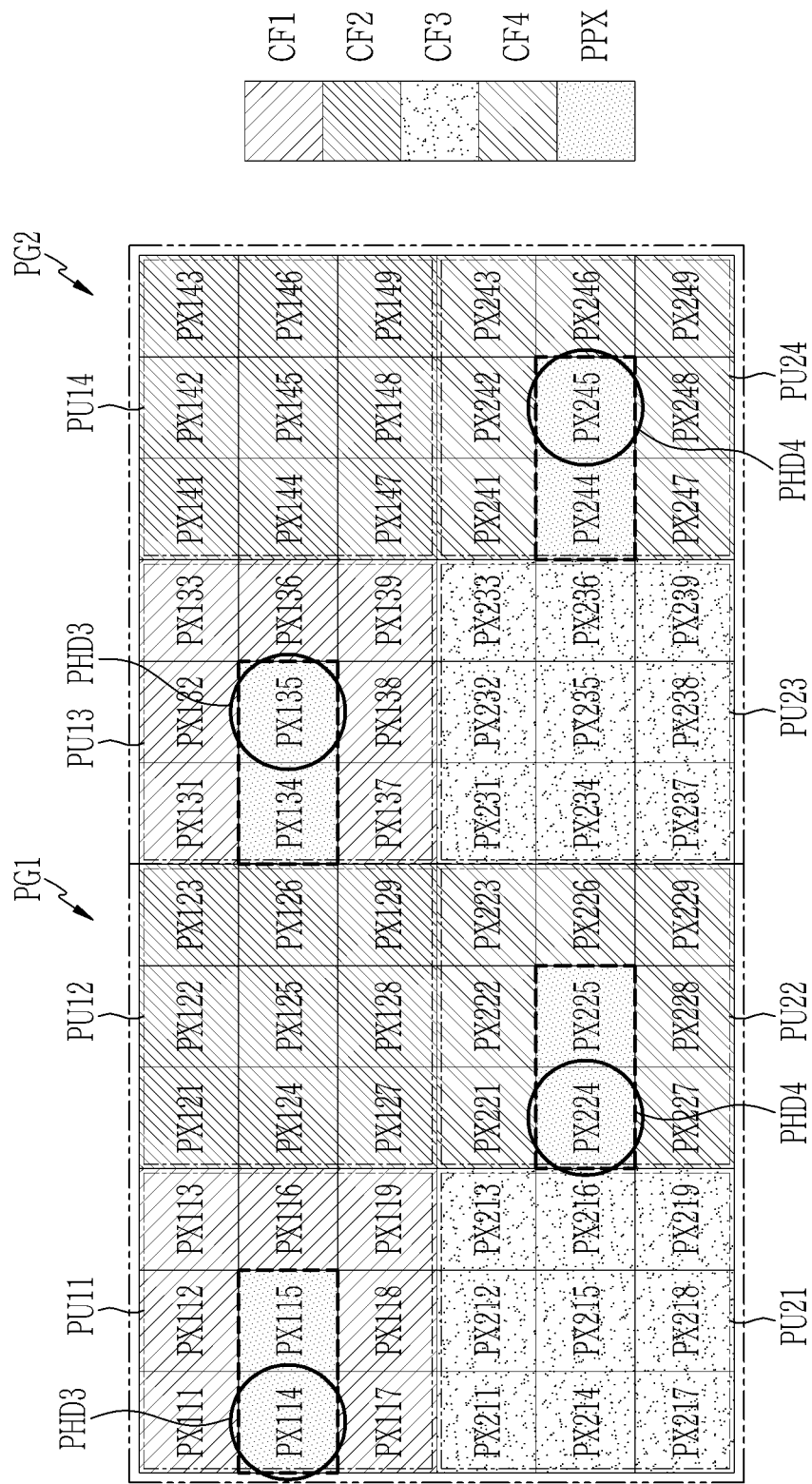
FIG. 8 is a top plan view showing a pixel arrangement of a pixel array according to an embodiment.

FIG. 8 is a top plan view showing a pixel arrangement of a pixel array according to an embodiment.

The sub-pixels PX114 and PX115 located in the green pixel unit PU11, the sub-pixels PX134 and PX135 located in the green pixel unit PU13, the sub-pixels PX224 and PX225 located in the green pixel unit PU22, and the sub-pixels PX244 and PX245 located in the green pixel unit PU24 are the phase detection cells PPX. A ratio of the number of the phase-detection pixels PPX to the number of a plurality of sub-pixels located in the pixel array 110 may have a value of 1/9.

Specifically, the sub-pixel PX114 and the sub-pixel PX135 may constitute a pair of phase-detection pixels PHD3. In addition, the sub-pixel PX224 and the sub-pixel PX245 may constitute a pair of phase-detection pixels PHD4. In this case, one micro lens may be located on the photodiodes PD114 and PD115, and one micro lens may be located on the photodiodes PD134 and PD135. Of course, one micro lens may be located on each photodiode of the sub-pixel PX224 and the sub-pixel PX225, and one micro lens may also be located on each photodiode of the sub-pixel PX244 and the sub-pixel PX245.

Meanwhile, the sub-pixel PX114 may be a first phase detection pixel, and the sub-pixel PX135 may be a second phase detection pixel. Also, the sub-pixel PX224 may be a first phase detection pixel, and the sub-pixel PX245 may be a second phase detection pixel. Since the image sensor 100 may perform the phase detection for the object OBJECT by calculating the disparity according to the phase difference between the photodiodes of each of the first phase detection pixel and the second phase detection pixel, the images with the different phases may be obtained for the same object OBJECT.

As described above, the pixels arranged at the same position in the pixel group PG1 and PG2 may be controlled by the same transmission signal. The other pixels PX except for the phase-detection pixels PX114, PX115, PX134, PX135, PX224, PX225, PX244, and PX245 may be controlled by the same transmission signal for the pixels arranged at the corresponding positions within the pixel group. Also, a pair of phase-detection pixels PHD3 and PHD4 may be controlled by the same transmission signal.

This is described together referring to FIG. 5. First, the transmission signal that controls a pair of phase-detection pixels PHD3, i.e., the sub-pixel PX114 and the sub-pixel PX135, is transitioned to a high level H. Accordingly, the transmission transistors T114 and T135 are turned on, and the charges provided from each photovoltaic device PD114 and PD135 may be accumulated in each floating diffusion region. The pixel units PU11 and PU13 may output the phase signal based on the charges accumulated in the first floating diffusion region FD1 and the third floating diffusion region FD3. The CDS circuit 151 may derive the phase information for the object OBJECT by performing the correlated double sampling operation on the phase signals from each of the pixel units PU11 and PU13.

Thereafter, all of the remaining transmission signals except for the transmission signal controlling a pair of phase-detection pixels PHD3 are transitioned to a high level H. During this section, the remaining transmission transistors T111-T113 and T115-T119 in the pixel unit PU11 and the remaining transmission transistors T131-T134 and T136-T139 in the pixel unit PU13 may all be turned on. Accordingly, the charges provided from each photovoltaic device PD111-PD113 and PD115-PD119 may be further accumulated in the first floating diffusion region FD1, and the charges provided from each photovoltaic device PD131-PD134 and PD136-PD139 may be further accumulated in the third floating diffusion region FD3. The charges provided from all photovoltaic devices PD111-PD119 positioned in the pixel unit PU11 may be accumulated in the first floating diffusion region FD1, and the charges provided from all photovoltaic devices PD131-PD139 positioned in the pixel unit PU13 may be accumulated in the third floating diffusion region FD3. The pixel unit PU11 may output the pixel signal VOUT1 based on the charge accumulated in the first floating diffusion region FD1, and the pixel unit PU13 may output the pixel signal VOUT3 based on the third floating diffusion region FD3.

The CDS circuit 151 may derive the image information about the object OBJECT based on the charge of the photovoltaic device PD111-PD119 included in pixel signal VOUT1 and the charge of the photovoltaic device PD131-PD139 included in the pixel signal VOUT3.

A pair of phase-detection pixels PHD4 may operate in a similar manner to that of a pair of phase-detection pixels PHD3. Specifically, the transmission signal controlling a pair of phase-detection pixels PHD4, that is, the sub-pixel PX224 and the sub-pixel PX245, is transitioned to a high level H, and the charges provided from the photovoltaic devices of the sub-pixel PX224 and the sub-pixel PX245, respectively, may be accumulated in the floating diffusion region corresponding to each of the pixel units PU22 and PU24. The pixel unit PU22 may output the phase signal based on the charge accumulated in the corresponding floating diffusion region, and the pixel unit PU24 may output the phase signal based on the corresponding floating diffusion region. The CDS circuit 151 may derive the phase information for the object OBJECT by performing the correlated double sampling operation on the phase signals from each of the pixel units PU22 and PU24.

After that, all of the remaining transmission signals except for the transmission signal controlling a pair of phase-detection pixels PHD4 are transitioned to a high level H, so that the charge accumulated on the photovoltaic device in the remaining sub-pixels PX221-PX223 and PX225-PX229 within the pixel unit PU22 and the charge accumulated on the photovoltaic device within the remaining sub-pixels PX241-PX244 and PX246-PX249 within the pixel unit PU24 may respectively be accumulated in the floating diffusion region corresponding to each of the pixel units PU22 and PU24. Thereafter, each of the pixel units PU22 and PU24 outputs the pixel signal based on the accumulated charge in the corresponding floating diffusion region, and the CDS circuit 151 may derive the image information about the object OBJECT based on the pixel signal from each of the pixel units PU22 and PU24.

Figure 9:
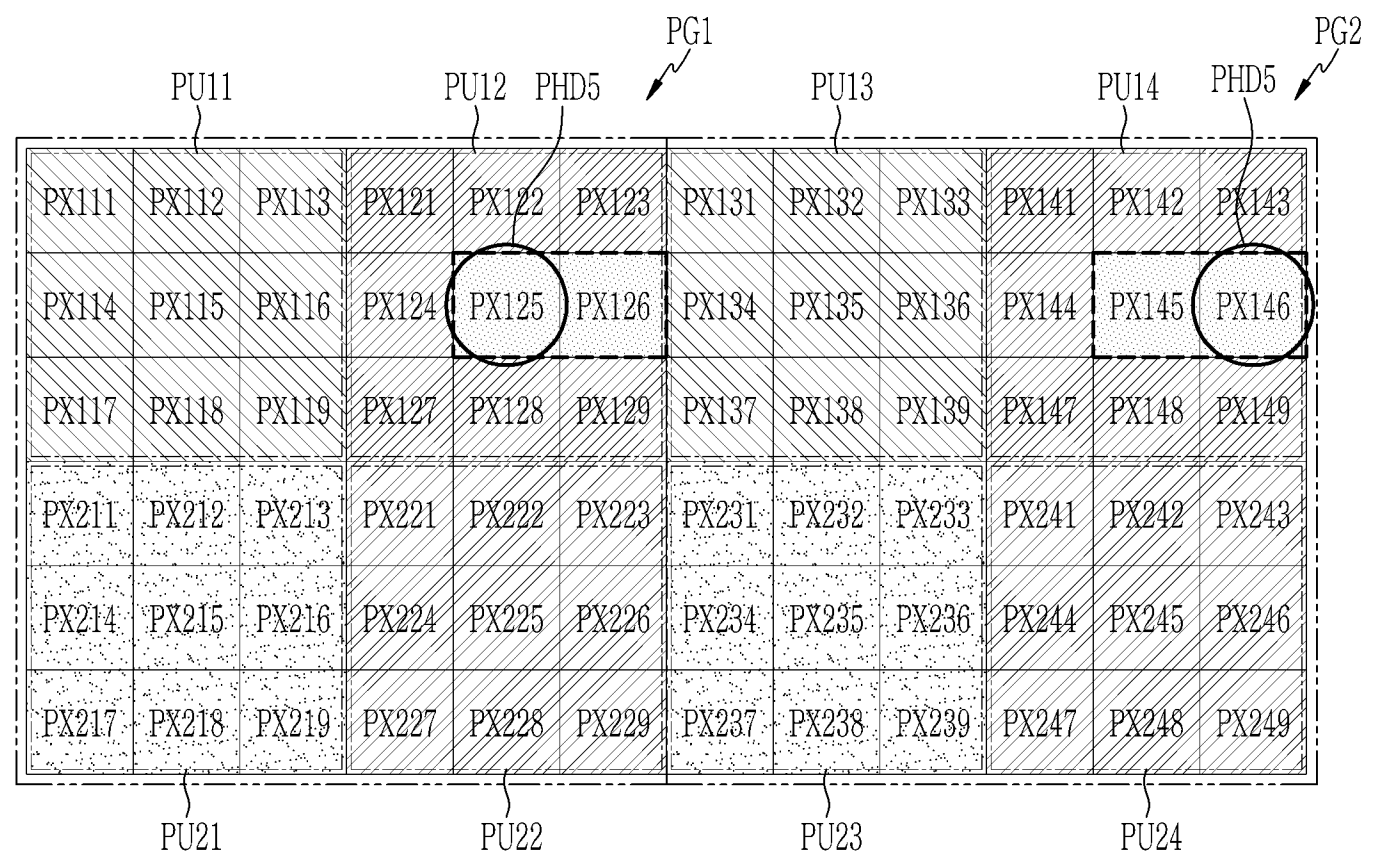

FIG. 9 is a top plan view showing a pixel arrangement in a pixel array according to an embodiment.

The sub-pixels PX125 and PX126 located in the red pixel unit PU12, and the sub-pixels PX145 and PX146 located in the red pixel unit PU14, are the phase detection cells PPX. A ratio of the number of the phase-detection pixels PPX to the number of a plurality of sub-pixels located in the pixel array 110 may have a value of 1/18.

Specifically, the sub-pixel PX125 and the sub-pixel PX146 may constitute a pair of phase-detection pixels PHD5. In this case, one micro lens may be located on each photodiode of the sub-pixel PX125 and the sub-pixel PX146, and one micro lens may be located on each photodiode of the sub-pixel PX145 and the sub-pixel PX146.

The sub-pixel PX125 may be a first phase detection pixel, and the sub-pixel PX146 may be a second phase detection pixel. Since the image sensor 100 may perform the phase detection for the object OBJECT by calculating the disparity according to the phase difference between the photodiodes of a pair of phase-detection pixels PHD5, the images having different phases for the same object OBJECT may be obtained.

Figure 10:
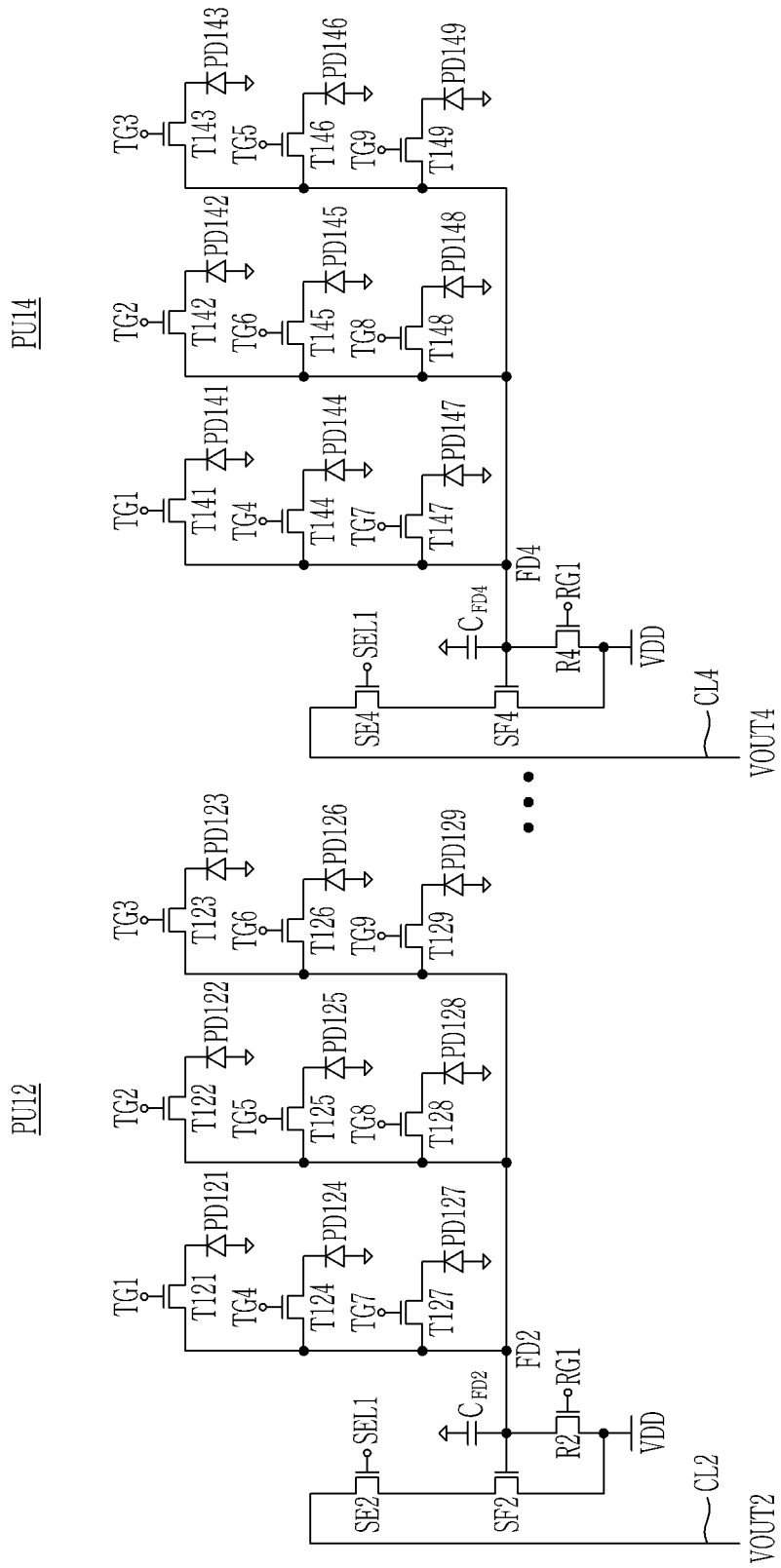
FIG. 10 is a circuit diagram showing a pixel unit according to an embodiment.

The structure of the pixel unit PU12 and the pixel unit PU14 is described together with reference to FIG. 10.

FIG. 10 is a circuit diagram showing a pixel unit according to an embodiment.

Illustratively, FIG. 10 is a circuit diagram of the pixel unit PU12 and the pixel unit PU14 shown in FIG. 9.

The pixel unit PU12 and the pixel unit PU14 may be a red pixel unit including a phase detection pixel. Meanwhile, the pixel units having the same color filter may have the similar structure in all pixel groups.

The sub-pixels of each pixel unit may share the same floating diffusion region. For example, the pixel unit PU12 may include the sub-pixels PX121-PX129, and the sub-pixels PX121-PX129 of the pixel unit PU12 may share the same floating diffusion region FD2.

The pixel unit PU12 may include a photovoltaic device PD121-PD129, a reset transistor R2, a driving transistor SF2, and a selection transistor SE2.

The sub-pixel PX121 may include a photovoltaic device PD121 and a transmission transistor T121. The sub-pixel PX122 may include a photovoltaic device PD122 and a transmission transistor T122, the sub-pixel PX123 may include a photovoltaic device PD123 and a transmission transistor T123, the sub-pixel PX124 may include a photovoltaic device PD124 and a transmission transistor T124, and the sub-pixel PX125 may include a photovoltaic device PD125 and a transmission transistor T125. Also, the sub-pixel PX126 may include a photovoltaic device PD126 and a transmission transistor T126, the sub-pixel PX127 may include a photovoltaic device PD127 and a transmission transistor T127, the sub-pixel PX128 may include a photovoltaic device PD128 and a transmission transistor T128, and the sub-pixel PX129 may include a photovoltaic device PD129 and a transmission transistor T129. The sub-pixels PX121-PX129 may share a reset transistor R2, a driving transistor SF2, and a selection transistor SE2.

The reset transistor R2 may be turned on by the reset signal RG1 to provide the reset voltage (e.g., the power source voltage VDD) to the second floating diffusion region FD2. The second floating diffusion region FD2 may accumulate the charges converted by at least one of the photovoltaic devices PD121-PD129. For example, the capacitance of the second floating diffusion region FD2 is shown as the second capacitance CFD2. The second floating diffusion region FD2 may be connected to a gate terminal of the driving transistor SF2 operating as a source follower amplifier. As a result, a voltage potential corresponding to the charge accumulated in the second floating diffusion region FD2 may be formed.

The driving transistor SF2 may amplify the change of the charge of the second floating diffusion region FD2 and generate the corresponding voltage (i.e., the pixel signal VOUT2). The selection transistor SE2 is driven by the selection signal SEL2 to select the pixel unit to read as a row unit. As the selection transistor SE2 is turned on, the pixel signal VOUT2 may be output to the readout circuit 150 through the column line CL2.

The transmission transistors T121-T129 may transfer the charges generated by the photovoltaic devices PD121-PD129 to the second floating diffusion region FD2. One of ends of the transmission transistors T121-T129 may be respectively connected to the photovoltaic devices PD121-PD129, and the other ends thereof may be commonly connected to the second floating diffusion region FD2. For example, during the section in which the transmission transistor T121 is turned on by the transmission signal TG1 received from the row driver 120, the charges provided from the photovoltaic device PD121 may be accumulated to the second floating diffusion region FD2. As the transmission transistors T122-T129 may be operated by the similar method, the charges provided from the photovoltaic devices PD122-PD129 may also be similarly accumulated on the second floating diffusion region FD2.

On the other hand, the pixel unit PU14 may include the sub-pixels PX141-PX149, and the sub-pixels PX141-PX149 of the pixel unit PU14 may share the same floating diffusion region FD3. The pixel unit PU14 may include photovoltaic devices PD141-PD149, a reset transistor R4, a driving transistor SF4, and a selection transistor SE4.

The sub-pixel PX141 may include a photovoltaic device PD141 and a transmission transistor T141. The sub-pixel PX142 may include a photovoltaic device PD142 and a transmission transistor T142, the sub-pixel PX143 may include a photovoltaic device PD143 and a transmission transistor T143, the sub-pixel PX144 may include a photovoltaic device PD144 and a transmission transistor T144, and the sub-pixel PX145 may include a photovoltaic device PD145 and a transmission transistor T145. Further, the sub-pixel PX146 may include a photovoltaic device PD146 and a transmission transistor T146, the sub-pixel PX147 may include a photovoltaic device PD147 and a transmission transistor T147, the sub-pixel PX148 may include a photovoltaic device PD148 and a transmission transistor T148, and the sub-pixel PX149 may include a photovoltaic device PD149 and a transmission transistor T149. The sub-pixels PX141-PX149 may share a reset transistor R4, a driving transistor SF4, and a selection transistor SE4.

The reset transistor R4 may be turned on by the reset signal RG1 to provide a reset voltage (e.g., a power source voltage VDD) to the fourth floating diffusion region FD4. The fourth floating diffusion region FD4 may accumulate charges converted by at least one of the photovoltaic devices PD141-PD149. As an example, the capacitance of the fourth floating diffusion region FD4 is represented by a fourth capacitance CFD4. The fourth floating diffusion region FD4 may be connected to a gate terminal of the driving transistor SF4 operating as a source follower amplifier. As a result, a voltage potential corresponding to the charge accumulated in the fourth floating diffusion region FD4 may be formed.

The driving transistor SF4 may amplify the change in the charge of the fourth floating diffusion region FD4 and generate a voltage (i.e., a pixel signal VOUT4) corresponding thereto. The selection transistor SE4 is driven by the selection signal SEL1 to select the pixels to be read by a row unit. As the selection transistor SE4 is turned on, the pixel signal VOUT4 may be output to the readout circuit 150 through the column line CL4.

Transmission transistors T141-T149 may transmit the charges generated by the photovoltaic devices PD141-PD149 to the fourth floating diffusion region FD4. One of ends of the transmission transistors T141-T149 may be respectively connected to the photovoltaic devices PD141-PD149, and the other ends may be commonly connected to the fourth floating diffusion region FD4.

In some embodiments, the sub-pixels other than phase-detection pixels PX125, PX126, PX145, and PX146 may be controlled by the same transmission signal with the pixels arranged at the corresponding positions within a pixel group.

A pair of phase-detection pixels PHD5 may be controlled by the same transmission signal. In detail, the first phase detection pixel (e.g., the sub-pixel PX125) and the second phase detection pixel (e.g., the sub-pixel PX146) may be controlled by one transmission signal, for example the fifth transmission signal TG5.

First, the transmission signal controlling a pair of phase-detection pixels PHD5, that is, the sub-pixel PX125 and the sub-pixel PX146, is transitioned into a high level H. Accordingly, the transmission transistor T125 and the transmission transistor T146 are turned on, so that the charges provided from each photovoltaic device PD125 and photovoltaic device PD146 may be accumulated in each floating diffusion region. The CDS circuit 151 may derive the phase information for the object OBJECT by performing the correlated double sampling operation for the phase signals from the first phase detection pixel and the second phase detection pixel.

Thereafter, all of the remaining transmission signals except for the transmission signal controlling a pair of phase-detection pixels PHD5 are transitioned to a high level H. During this section, the remaining transmission transistors T121-T124 and T126-T129 in the pixel unit PU12 and the remaining transmission transistors T141-T145 and T147-T149 in the pixel unit PU14 may all be turned on. Accordingly, the charges provided from each photovoltaic device PD121-PD124 and PD126-PD129 may be further accumulated in the floating diffusion region corresponding to the pixel unit PU12, and the charges provided from each photovoltaic device PD141-PD145 and PD147-PD149 may be further accumulated in the floating diffusion region corresponding to the pixel unit PU14. Accordingly, in each floating diffusion region, the charges provided from all photovoltaic devices PD121-PD129 positioned within the pixel unit PU12 and the charges provided from all photovoltaic devices PD141-PD149 positioned within the pixel unit PU14 may be accumulated.

Specifically, the CDS circuit 151 may derive the image information of the object OBJECT based on the charges of the photovoltaic devices PD121-PD129 included in the pixel signal VOUT2 and the charges of the photovoltaic devices PD141-PD149 included in the pixel signal VOUT4.

Figure 11:
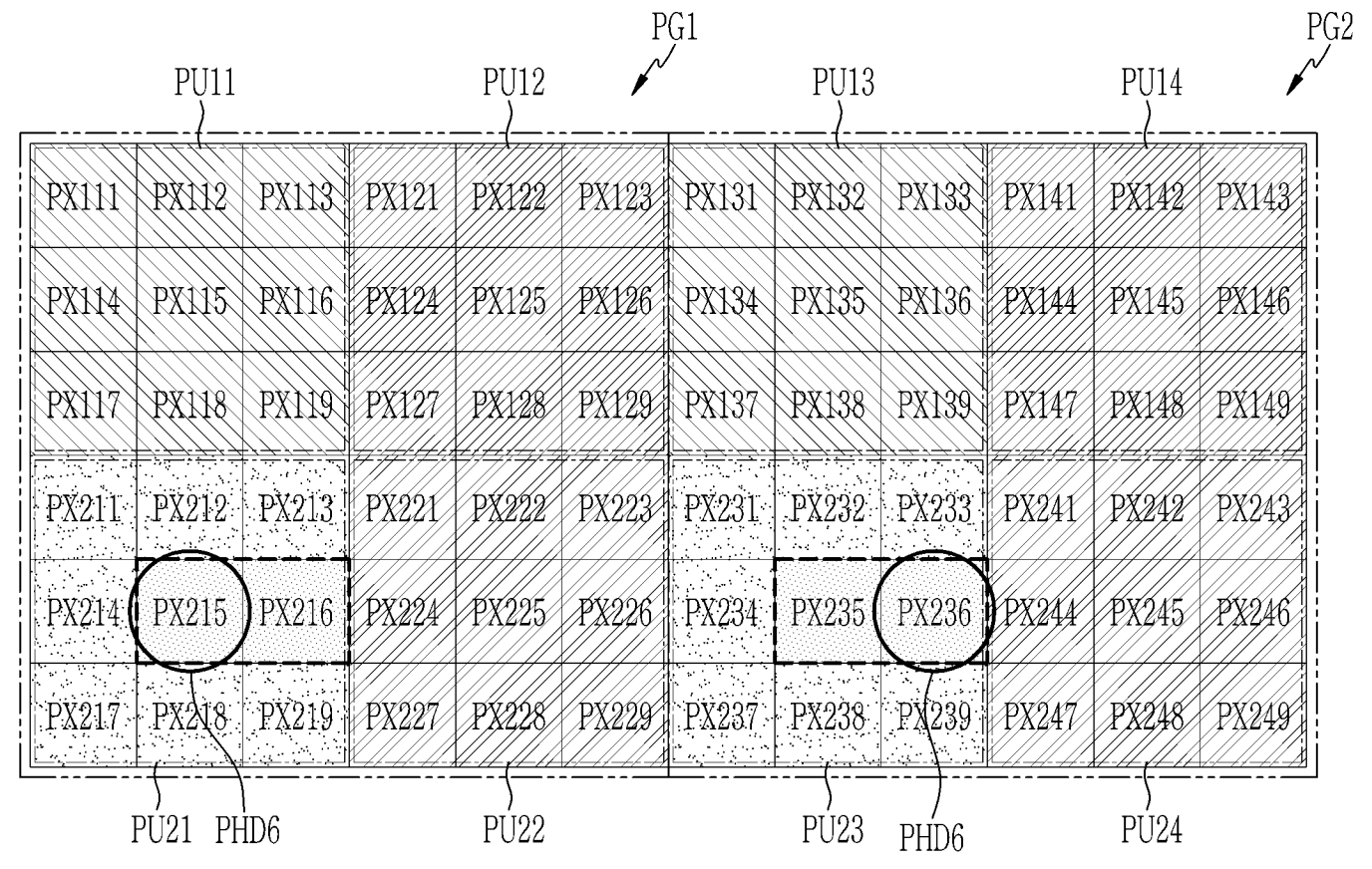

FIG. 11 is a top plan view showing a pixel arrangement of a pixel array according to an embodiment.

The sub-pixels PX215 and PX216 located in the blue pixel unit PU21 and the sub-pixels PX235 and PX236 located in the blue pixel unit PU23 are the phase detection cells PPX. A ratio of the number of phase-detection pixels PPX to the number of a plurality of sub-pixels located in the pixel array 110 may have a value of 1/18.

Specifically, the sub-pixel PX215 and the sub-pixel PX236 may constitute a pair of phase-detection pixels PHD6. In this case, one micro lens may be located on the photodiodes of the sub-pixel PX215 and the sub-pixel PX216, and one micro lens may be located on the photodiodes of the sub-pixel PX235 and the sub-pixel PX236.

The sub-pixel PX215 may be a first phase detection pixel, and the sub-pixel PX236 may be a second phase detection pixel. Since the image sensor 100 may perform the phase detection for the object OBJECT by calculating a disparity according to a phase difference between the photodiodes of a pair of phase-detection pixels PHD6, it is possible to obtain the images having the different phases for the same object OBJECT.

The pixel unit PU21 and the pixel unit PU23 may be the same as the structure of the pixel unit PU11 and the pixel unit PU13 described above with reference to FIG. 5.

As described above, the sub-pixels arranged at the same position in the pixel groups PG1 and PG2 may be controlled by the same transmission signal. Except for phase-detection pixels PX215, PX216, PX235, and PX236, the other sub-pixels PX211-PX214, PX217-PX219, PX231-PX234, and PX237-PX239 may be controlled by the same transmission signal with the pixels arranged at corresponding positions within the pixel group. Also, a pair of phase-detection pixels PHD6 may be controlled by the same transmission signal.

First, the transmission signal controlling a pair of phase-detection pixels PHD6 is transitioned to a high level H. Accordingly, the charges provided from the photoelectric conversion element of each of the sub-pixel PX215 as the first phase detection pixel and the sub-pixel PX236 as the second phase detection pixel may be accumulated in the floating diffusion region corresponding to each pixel unit PU21 and PU23. The pixel unit PU21 may output the phase signal based on the charges accumulated in the corresponding floating diffusion region, and the pixel unit PU23 may output the phase signal based on the corresponding floating diffusion region. The CDS circuit 151 may derive the phase information for the object OBJECT by performing the correlated double sampling operation on the phase signals from the pixel units PU21 and PU23, respectively.

Thereafter, all of the remaining transmission signals except for the transmission signal controlling a pair of phase-detection pixels PHD6 are transitioned to a high level H. During this section, the charges accumulated in the photovoltaic device within the remaining sub-pixels PX211-PX214 and PX216-PX219 within the pixel unit PU21 and the charges accumulated in the photovoltaic device within the remaining sub-pixels PX231-PX235 and PX237-PX239 within the pixel unit PU23 may be accumulated in the floating diffusion region corresponding to each pixel unit PU21 and PU23. Thereafter, each of the pixel units PU21 and PU23 may output the pixel signal based on the accumulated charges in the corresponding floating diffusion region, and the CDS circuit 151 may derive the image information for the object OBJECT based on the pixel signal from each of the pixel units PU21 and PU23.

Figure 12:
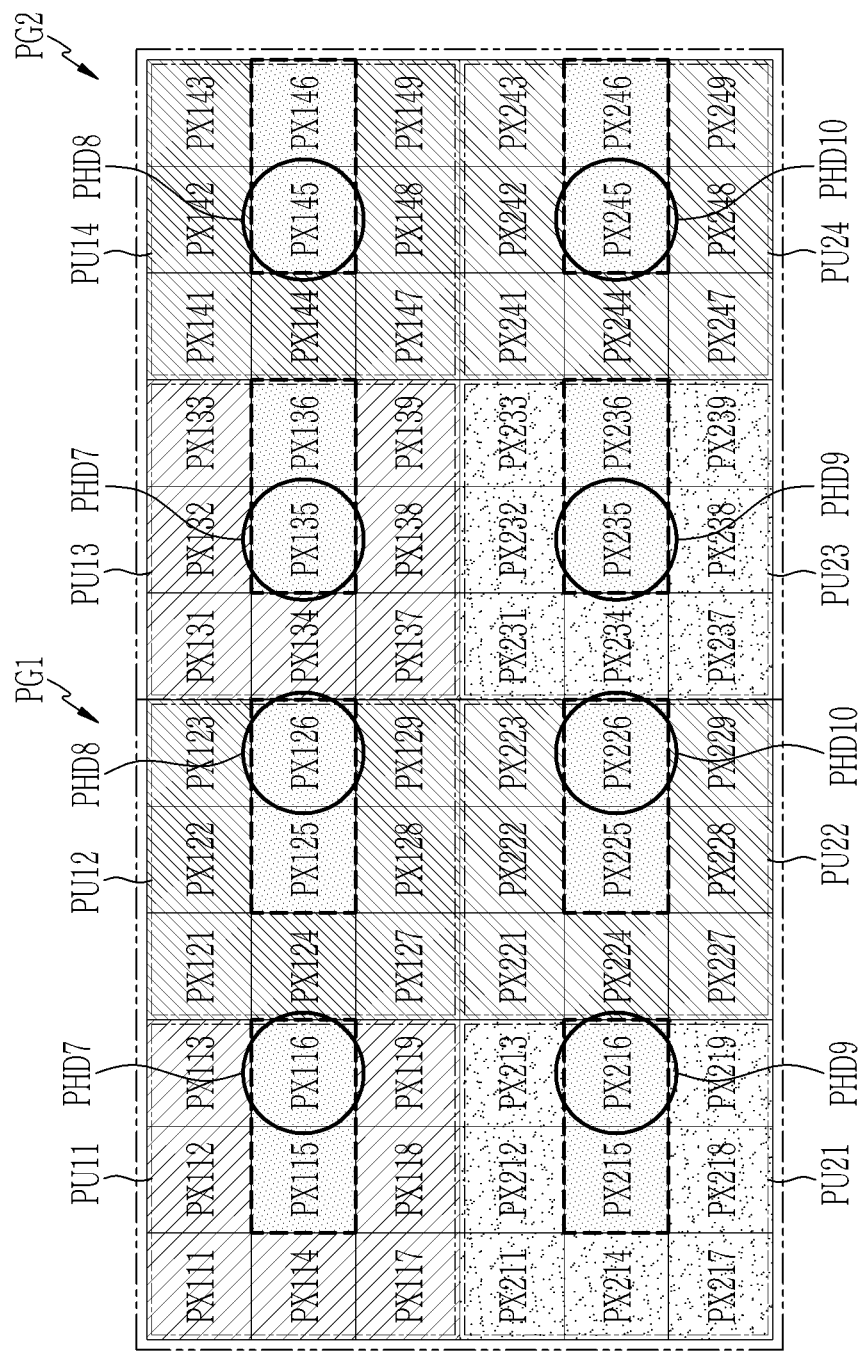

FIG. 12 is a top plan view showing a pixel arrangement of a pixel array according to an embodiment.

The sub-pixels PX115 and PX116 located in the green pixel unit PU11, the sub-pixels PX125 and PX126 located in the red pixel unit PU12, the sub-pixels PX134 and PX135 located in the green pixel unit PU13, the sub-pixels PX145 and PX146 located in the red pixel unit PU14, the sub-pixels PX215 and PX216 located in the blue pixel unit PU21, the sub-pixels PX225 and PX226 located in the green pixel unit PU22, the sub-pixels PX235 and PX236 located in the blue pixel unit PU23, and the sub-pixels PX245 and PX246 located in the green pixel unit PU24 are the phase detection cells PPX. A ratio of the number of phase-detection pixels PPX to the number of a plurality of sub-pixels located in the pixel array 110 may have a value of 2/9.

in some embodiments, the phase-detection pixels PPX positioned on the right of two phase-detection pixels PPX located left and right within the first pixel unit in any one pixel group and the first pixel unit positioned on the left of two phase-detection pixels PPX located to the left and right in another pixel group positioned adjacent to the pixel group may constitute a pair of phase-detection pixels PHD. In this case, the first pixel unit may be a green pixel unit, a red pixel unit, or a blue pixel unit.

Specifically, the sub-pixel PX116 and the sub-pixel PX135 may constitute a pair of phase-detection pixels PHD7. In addition, the sub-pixel PX126 and the sub-pixel PX145 may constitute a pair of phase-detection pixels PHD8. The sub-pixel PX216 and the sub-pixel PX235 may constitute a pair of phase-detection pixels PHD9. The sub-pixel PX226 and the sub-pixel PX245 may constitute a pair of phase-detection pixels PHD10.

One micro lens may located on each photodiode of the sub-pixel PX115 and the sub-pixel PX116, one micro lens may be located on each photodiode of the sub-pixel PX125 and the sub-pixel PX126, one micro lens may be located on each photodiode of the sub-pixel PX135 and the sub-pixel PX136, one micro lens may be located on each photodiode of the sub-pixel PX215 and the sub-pixel PX216, one micro lens may be located on each photodiode of the sub-pixel PX225 and the sub-pixel PX226, one micro lens may be located on each photodiode of the sub-pixel PX235 and the sub-pixel PX236, and one micro lens may be located on each photodiode of the sub-pixel PX245 and the sub-pixel PX246.

The sub-pixel PX135, the sub-pixel PX145, the sub-pixel PX235, and the sub-pixel PX245 may be the first phase detection pixel. Also, the sub-pixel PX116, the sub-pixel PX126, the sub-pixel PX216, and the sub-pixel PX226 may be the second phase detection pixel.

The image sensor 100 may perform the phase detection for the object OBJECT by calculating the disparity according to the phase difference between the photodiodes of a pair of phase-detection pixels PHD7, PHD8, PHD9, and PHD10, thereby acquiring the images with the different phases for the same object OBJECT.

The structure of each pixel unit PU21-PU24 may be the same as the structure of the pixel units PU11-PU14 described with reference to FIG. 5 and FIG. 10.

As described above, the sub-pixels arranged at the same position in the pixel groups PG1 and PG2 may be controlled by the same transmission signal. Except for the phase-detection pixels PX115, PX116, PX125, PX126, PX134, PX135, PX145, PX146, PX215, PX216, PX225, PX226, PX235, and PX236, the sub-pixels may be controlled by the same transmission signal for the pixels arranged at the corresponding positions within the pixel group. Also, a pair of phase-detection pixels PHD7, PHD8, PHD9, and PHD10 may be controlled by the same transmission signal.

First, the transmission signal controlling a pair of phase-detection pixels PHD7, PHD8, PHD9, and PHD10 is transitioned to a high level H. Specifically, the charges provided from the photovoltaic device of each of the sub-pixel PX116 and the sub-pixel PX135 of a pair of phase-detection pixels PHD7 may be accumulated in the floating diffusion region corresponding to each of the pixel units PU11 and PU13. The pixel unit PU11 may output the phase signal based on the charges accumulated in the corresponding floating diffusion region, and the pixel unit PU13 may output the phase signal based on the corresponding floating diffusion region. The CDS circuit 151 may derive the phase information for the object OBJECT by performing the correlated double sampling operation on the phase signals from each of the pixel units PU11 and PU13. Similarly, a pair of phase-detection pixels PHD8, PHD9, and PHD10 may be operated similarly to output the phase signal from each pixel unit, and the CDS circuit 151 may derive the phase information from the phase signal received from each pixel unit.

Thereafter, all of the remaining transmission signals except for the transmission signals controlling a pair of phase-detection pixels PHD7, PHD8, PHD9, and PHD10 are transitioned to a high level H. Specifically, the charges accumulated in the photovoltaic device in the remaining sub-pixels PX111-PX115 and PX117-PX119 in the pixel unit PU11 and the charges accumulated in the photovoltaic device in the remaining sub-pixels PX131-PX134 and PX136-PX139 in the pixel unit PU13 may be accumulated in the floating diffusion region corresponding to each of the pixel units PU11 and PU13. Thereafter, each of the pixel units PU11 and PU13 may output the pixel signal based on the accumulated charge in the corresponding floating diffusion region, and the CDS circuit 151 may derive the image information for the object OBJECT based on the pixel signal from each of the pixel units PU11 and PU13. Similarly, a pair of phase-detection pixels PHD8, PHD9, and PHD10 may be operated similarly to output the pixel signal from each pixel unit, and the CDS circuit 151 may derive the image information from the pixel signal received from each pixel unit.

Figure 13:
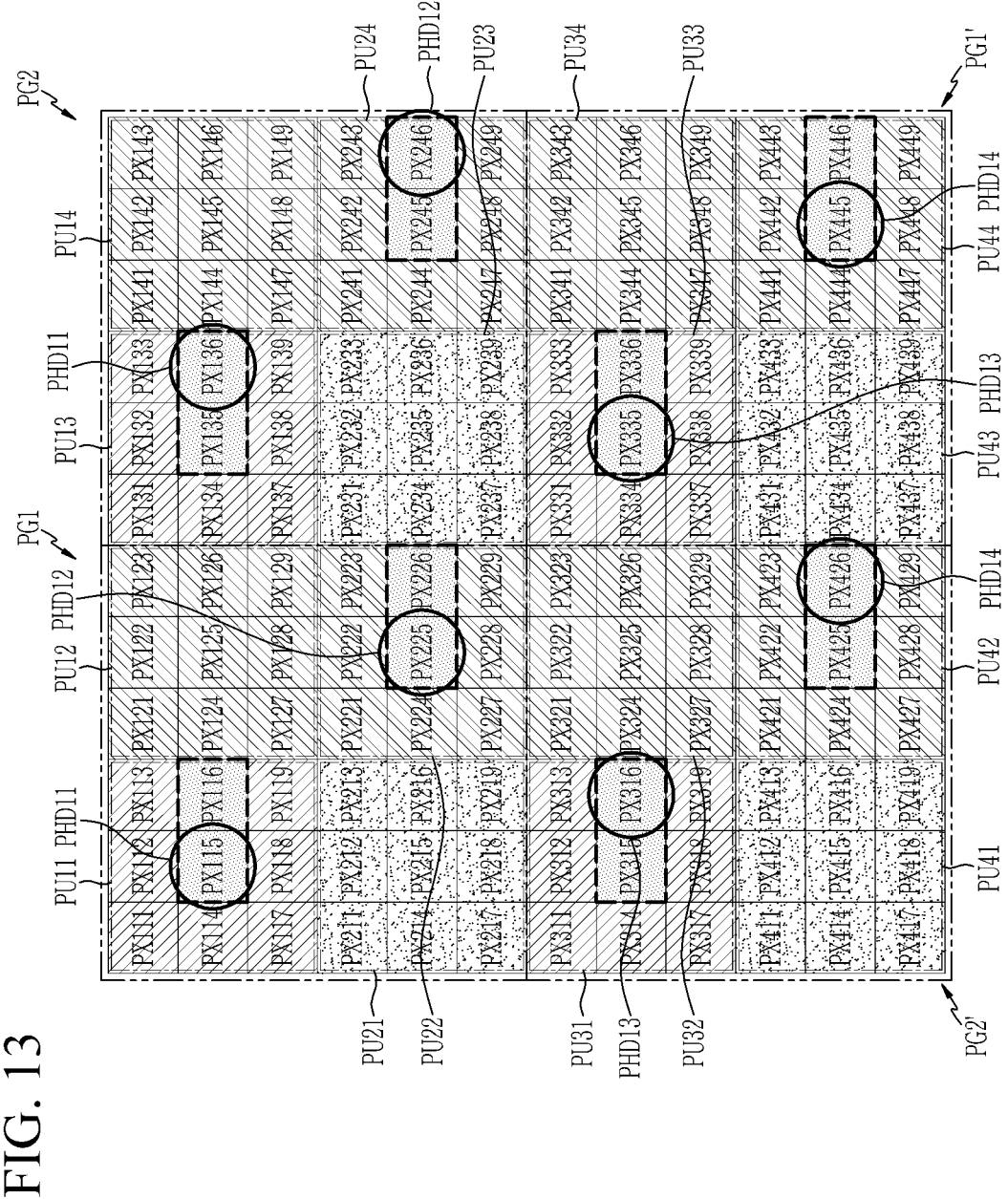

FIG. 13 is a top plan view showing a pixel arrangement of a pixel array according to an embodiment.

One pixel group may include 2×2 pixel units. Specifically, the first pixel group PG1 may include the 2×2 pixel units PU11, PU12, PU21, and PU22. Also, the second pixel group PG2 may include the 2×2 pixel units PU13, PU14, PU23, and PU24. The first' pixel group PG1' may include the 2×2 pixel units PU31, PU32, PU41, and PU42. The second' pixel group PG2' may include the 2×2 pixel units PU33, PU34, PU43, and PU44.

On the other hand, as shown in FIG. 12, the second' pixel group PG2' may be located below the first pixel group PG1, and a first' pixel group PG1' may be located below the second pixel group PG2. The first pixel group PG1 and the first' pixel group PG1' may have the same pixel arrangement, and the second pixel group PG2 and the second' pixel group PG2' may also have the same pixel arrangement.

The sub-pixels PX115 and PX116 located in the green pixel unit PU11, the sub-pixels PX135 and PX136 located in the green pixel unit PU13, the sub-pixels PX225 and PX226 in the green pixel unit PU22, and the sub-pixels PX245 and PX246 located in the green pixel unit PU24 are the phase detection cells PPX. In addition, the sub-pixels PX315 and PX316 located in the green pixel unit PU31, the sub-pixels PX335 and PX336 located in the green pixel unit PU33, the sub-pixels PX425 and PX426 located in the green pixel unit PU42, and the sub-pixels PX445 and PX446 located in the green pixel unit PU44 are the phase detection cells PPX. A ratio of the number of phase-detection pixels PPX to the number of a plurality of sub-pixels located in the pixel array 110 may have a value of 1/9.

Specifically, the sub-pixel PX115 and the sub-pixel PX136 may constitute a pair of phase-detection pixels PHD11. The sub-pixel PX225 and sub-pixel PX246 may constitute a pair of phase-detection pixels PHD12. The sub-pixel PX316 and the sub-pixel PX335 may constitute a pair of phase-detection pixels PHD13, and the sub-pixel PX426 and the sub-pixel PX445 may constitute a pair of phase-detection pixels PHD14.

One micro lens may be located on each photodiode of the sub-pixel PX115 and the sub-pixel PX116, one micro lens may be located on each photodiode of the sub-pixel PX135 and the sub-pixel PX136, one micro lens may be located on each photodiode of the sub-pixel PX225 and the sub-pixel PX226, and one micro lens may be located on each photodiode of the sub-pixel PX245 and the sub-pixel PX246. In addition, one micro lens may be located on each photodiode of the sub-pixel PX315 and the sub-pixel PX316, one micro lens may be located on each photodiode of the sub-pixel PX335 and the sub-pixel PX336, one micro lens may be located on each photodiode of the sub-pixel PX425 and the sub-pixel PX426, and one micro lens may be located on each photodiode of the sub-pixel PX445 and the sub-pixel PX446.

The sub-pixel PX115, the sub-pixel PX225, the sub-pixel PX335, and the sub-pixel PX445 may be the first phase-detection pixels. Also, the sub-pixel PX136, the sub-pixel PX246, the sub-pixel PX316, and the sub-pixel PX426 may be the second phase-detection pixels.

The image sensor 100 may perform the phase detection for the object OBJECT by calculating the disparity according to the phase difference between the photodiodes of a pair of phase-detection pixels PHD11, PHD12, PHD13, and PHD14, thereby obtaining the image having the different phase for the same object OBJECT.

On the other hand, by alternately positioning the first phase detection pixel and the second phase detection pixel by a row in the pixel array 110, more accurate phase detection may be performed than when the first phase detection pixel and the second phase detection pixel are repeatedly arranged in the same position.

The pixels arranged at the same position in the pixel groups PG1 and PG2 may be controlled by the same transmission signal. Except for the phase-detection pixels PX115, PX116, PX135, PX136, PX225, PX226, PX245, PX246, PX315, PX316, PX335, PX336, PX425, PX426, PX445, and PX446, the other pixels PX may be controlled by the same transmission signal among the pixels arranged at the corresponding positions within the pixel group. Also, a pair of phase-detection pixels PHD may be controlled by the same transmission signal.

First, the transmission signal controlling a pair of phase-detection pixels PHD11, PHD12, PHD13, and PHD14 is transitioned to a high level H, and the charge accumulated in the photovoltaic device PD in each phase-detection pixels PPX may be accumulated in the floating diffusion region corresponding to each pixel unit. Thereafter, the CDS circuit 151 may derive the phase information on the object OBJECT by performing the correlated double sampling operation on the phase signals from a pair of phase-detection pixels PHD11, PHD12, PHD13, and PHD14.

After that, all other transmission signals except for the transmission signal controlling a pair of phase-detection pixels PHD11, PHD12, PHD13, and PHD14 are transitioned to a high level H, and the charge accumulated in all photovoltaic devices PD of the pixel PX positioned within one pixel unit may be accumulated in the floating diffusion region corresponding to each pixel unit. Thereafter, the CDS circuit 151 may derive the image information about the object OBJECT based on the charge of the photovoltaic device PD included in the pixel signal VOUT output from each pixel unit.

Figure 14:
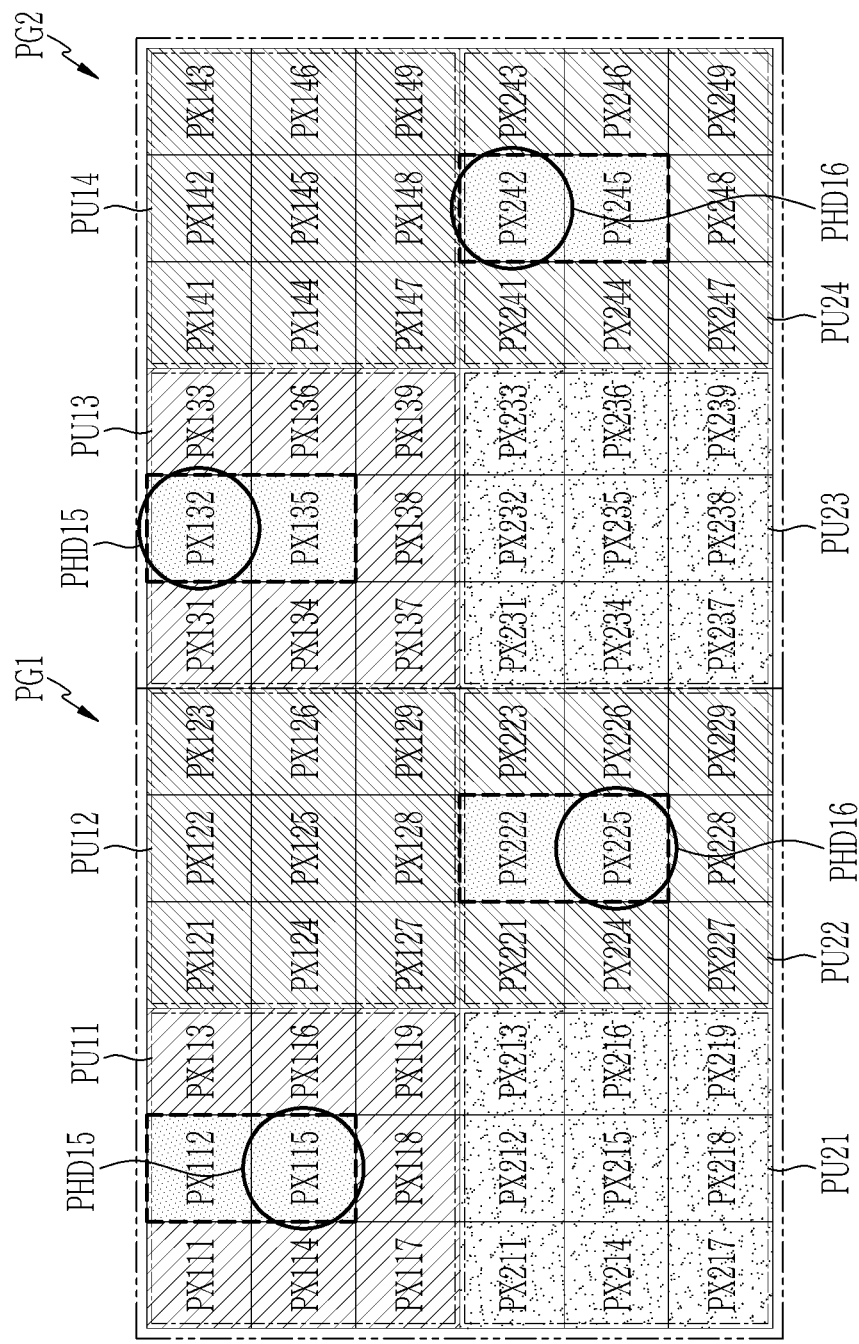

FIG. 14 is a top plan view showing a pixel arrangement of a pixel array according to an embodiment. One pixel unit PU11 may include a plurality of phase-detection pixels PX112, and PX115 arranged vertically adjacently, one pixel unit PU13 may include a plurality of phase-detection pixels PX132 and PX135 arranged vertically adjacently, one pixel unit PU22 may include a plurality of phase-detection pixels PX222 and PX225 arranged vertically adjacent to each other, and one pixel unit PU24 may include a plurality of phase-detection pixels PX242 and PX245 arranged vertically adjacently. A ratio of the number of phase-detection pixels PPX to the number of a plurality of sub-pixels located in the pixel array 110 may have a value of 1/9.

In this case, one micro lens may be located on each photodiode of the sub-pixel PX112 and the sub-pixel PX115, one micro lens may be located on each photodiode of the sub-pixel PX132 and the sub-pixel PX135, one micro lens may be located on each photodiode of the sub-pixel PX222 and the sub-pixel PX225, and one micro lens may be located on each photodiode of the sub-pixel PX242 and the sub-pixel PX245.

The phase-detection pixels included in the two adjacent pixel groups PG1 and PG2, respectively, may form a pair and be used to calculate the distance from the object OBJECT. in some embodiments, the phase detection pixel PX115 located downward among two phase-detection pixels located up and down in the first pixel unit PU11 in one pixel group PG1 and the phase detection pixel PX132 located upward among two phase-detection pixels located up and down in the first pixel unit PU13 in the pixel group PG2 adjacent to the pixel group PG1 may form a pair of phase-detection pixels PHD15. Also, similarly, the sub-pixel PX225 and the sub-pixel PX242 may constitute a pair of phase-detection pixels PHD16.

A pair of phase-detection pixels PHD15 and PHD16 may include a third phase detection pixel and a fourth phase detection pixel. Each of the third and fourth phase-detection pixels PX115 and PX132 of a pair of phase-detection pixels PHD15 may be positioned in the different pixel groups PG1 and PG2. Each of the third and fourth phase-detection pixels PX225 and PX242 of a pair of phase-detection pixels PHD16 may be positioned in the different pixel groups PG1 and PG2.

The image sensor 100 may calculate the distance to the object OBJECT based on the pixel signal difference of a pair of phase-detection pixels PHD15 and PHD16 and may detect the focus of the object OBJECT based on the calculated distance. For example, among a pair of phase-detection pixels PHD15 and PHD16, the third phase detection pixel PX115 and PX225 may represent the lower side image for the object OBJECT, and the fourth phase detection pixel PX132 and PX242 may represent the upper side image for the object OBJECT. The image sensor 100 may perform the phase detection for the object OBJECT by calculating the disparity between the phase signals of a pair of phase-detection pixels PHD15 and PHD16.

As described above, the pixels arranged at the same position in the pixel groups PG1 and PG2 may be controlled by the same transmission signal. Except for phase-detection pixels PX112, PX115, PX132, PX135, PX222, PX225, PX242, and PX245, the other pixels may be controlled by the same transmission signal among the pixels arranged at the corresponding positions within the pixel group. A pair of phase-detection pixels PHD15 and PHD16 may be controlled by the same transmission signal.

First, a transmission signal controlling a pair of phase-detection pixels PHD15, that is, the sub-pixel PX115 and the sub-pixel PX132, and the sub-pixel PX225 and the sub-pixel PX242, are transitioned to a high level H. Specifically, the charges provided from each photoelectric conversion element of each of the sub-pixel PX115, which is a third phase detection pixel, and the sub-pixel PX132, which is a fourth phase detection pixel, may be accumulated in the floating diffusion region corresponding to each pixel unit PU11 and PU13. The pixel unit PU11 may output the phase signal based on the charges accumulated in the corresponding floating diffusion region, and the pixel unit PU13 may output the phase signal based on the corresponding floating diffusion region. The CDS circuit 151 may derive the phase information for the object OBJECT by performing the correlated double sampling operation on the phase signals from each of the pixel units PU11 and PU13. Similarly, a pair of phase-detection pixels PHD16 may be operated similarly to output the phase signal from each pixel unit, and the CDS circuit 151 may derive the phase information from the phase signal received from each pixel unit. In this case, the phase information derived from a pair of phase-detection pixels PHD15 and PHD16 may include the upper and lower disparity for the object. The controller 130 may adjust the focus in the vertical direction for the object OBJECT by using the phase information derived from the CDS circuit 151.

Thereafter, all of the remaining transmission signals except for the transmission signal controlling a pair of phase-detection pixels PHD15 are transitioned to a high level H. During this section, the charge accumulated at the photovoltaic device in the remaining sub-pixels PX111-PX114 and PX116-PX119 in the pixel unit PU11 and the charge accumulated at the photovoltaic device in the remaining sub-pixels PX131 and PX133-PX139 in the pixel unit PU13 may be accumulated in the floating diffusion region corresponding to each pixel unit PU11 and PU13. Next, each pixel unit PU11 and PU13 may output the pixel signal based on the charge accumulated in the corresponding floating diffusion region, and the CDS circuit 151 may derive the image information for the object OBJECT based on the pixel signal from each pixel unit PU11 and PU13.

Figure 15:
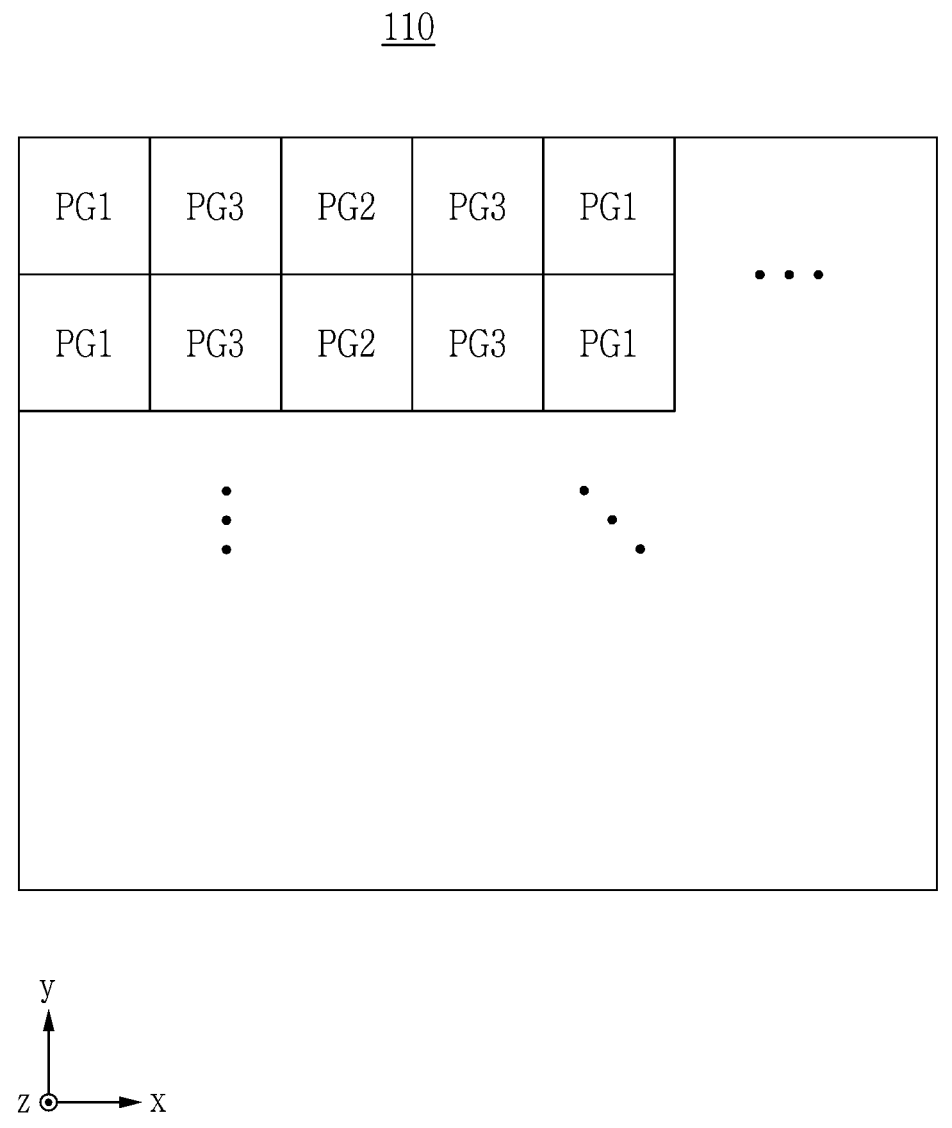
Figure 16:
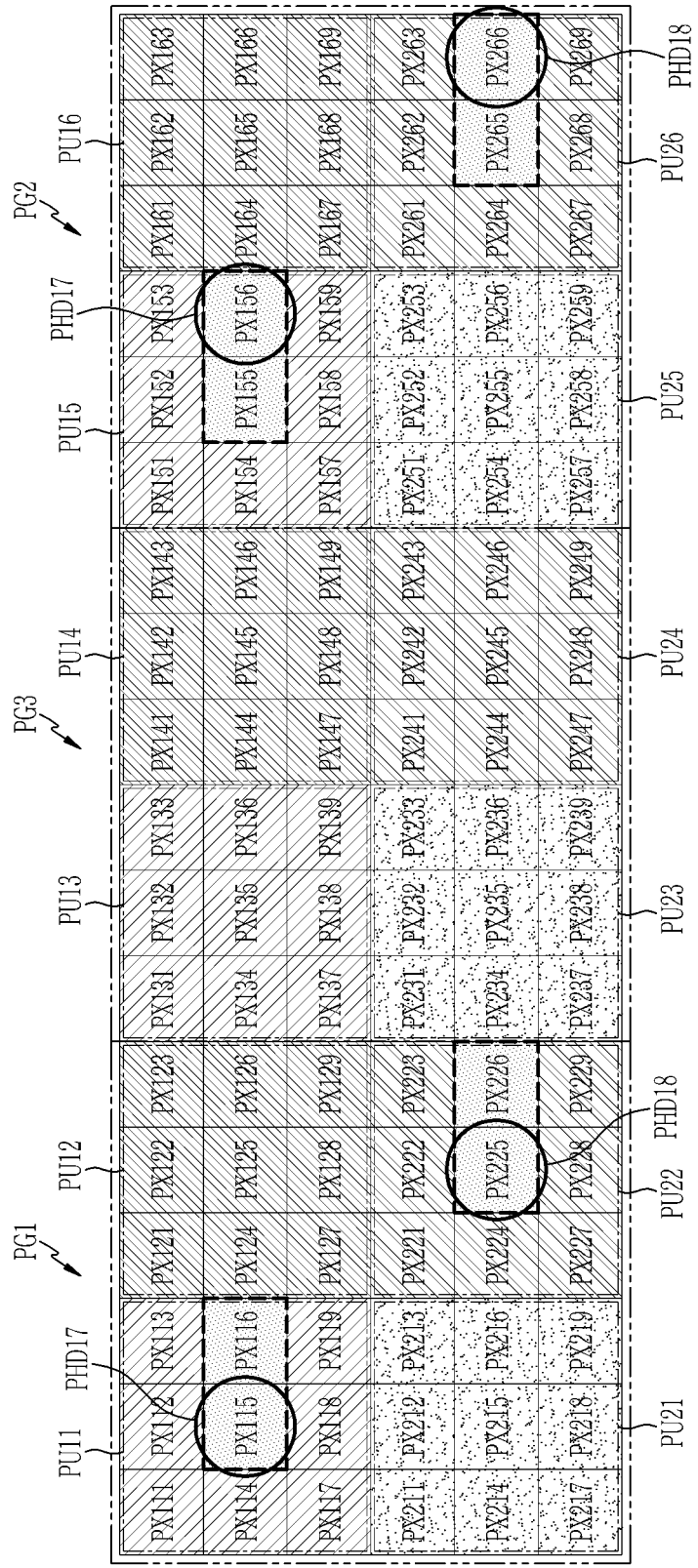

FIG. 15 and FIG. 16 are top plan views showing a pixel arrangement of a pixel array according to an embodiment.

As shown in FIG. 15, the pixel array 110 may include a first pixel group PG1, a third pixel group PG3, and a second pixel group PG2 repeatedly located on the substrate of the image sensor 100 along the X-axis. As shown in FIG. 15, the third pixel group PG3 may be located between the first pixel group PG1 and the second pixel group PG2, and the third pixel group PG3 may be a pixel group without the phase detection pixel.

A plurality of first pixel groups PG1 may be located in the first column, a plurality of third pixel groups PG3 may be located in the second column, and a plurality of second pixel groups PG2 may be located in the third column. That is, the same pixel group PG1, PG2, or PG3 may be located in the column direction, and the different pixel groups may be alternately located in the row direction.

FIG. 15 shows that all first pixel groups PG1 are located in the first column, but it is not limited thereto and the second pixel group PG2 or the third pixel group PG3 may be located.

FIG. 16 is the view showing the pixel arrangement in the first pixel group PG1, the second pixel group PG2, and the third pixel group PG3.

One pixel group may include 2×2-pixel units. Specifically, the first pixel group PG1 may include 2×2-pixel units PU11, PU12, PU21, and PU22. In addition, the third pixel group PG3 may include 2×2-pixel units PU13, PU14, PU23, and PU24. The second pixel group PG2 may include 2×2-pixel units PU15, PU16, PU25, and PU26.

One pixel unit may be defined as a set of the sub-pixels that share the same floating diffusion region with each other.

As shown in FIG. 16, the sub-pixels PX115 and PX116 located in the pixel unit PU11, and the sub-pixel PX225 and PX226 in the pixel unit PU22 are the phase detection cells PPX. In addition, the sub-pixels PX155 and PX156 located in the pixel unit PU15 and the sub-pixels PX265 and PX266 located in the pixel unit PU26 are the phase detection cells PPX. The phase detection pixel may not exist in the second pixel group PG2. In this case, a ratio of the number of phase-detection pixels PPX to the number of a plurality of sub-pixels located in the pixel array 110 may be 1/18. Since the ratio occupied by the image sensing pixels IPX in the pixel array 110 is relatively large, the image sensor 100 may derive more accurate image information about the object OBJECT.

Specifically, the sub-pixel PX115 and the sub-pixel PX156 may constitute a pair of phase-detection pixels PHD17. The sub-pixel PX225 and sub-pixel PX266 can constitute a pair of phase-detection pixels PHD18.

One micro lens may be located on each photodiode of the sub-pixel PX115 and the sub-pixel PX156, one micro lens may be located on each photodiode of the sub-pixel PX155 and the sub-pixel PX156, one micro lens may be located on each photodiode of the sub-pixel PX225 and the sub-pixel PX226, and one micro lens may be located on each photodiode of the sub-pixel PX265 and the sub-pixel PX266.

A pair of phase-detection pixels PHD17, PHD18 may include the first phase detection pixel and the second phase detection pixel. Each of the first and second phase-detection pixels PX115 and PX156 of a pair of phase-detection pixels PHD17 may be positioned in the different pixel groups PG1 and PG2, and a separate pixel group PG3 may be positioned between the pixel group PG1 and the pixel group PG2. Each of the first and second phase-detection pixels PX225 and PX266 of a pair of phase-detection pixels PHD18 may be positioned in the different pixel groups PG1 and PG2, and a separate pixel group PG3 may be positioned between the pixel group PG1 and the pixel group PG2.

The image sensor 100 may calculate the distance to the object OBJECT based on the pixel signal difference of a pair of phase-detection pixels PHD17 and PHD18 and may detect the focus of the object OBJECT based on the calculated distance. For example, among a pair of phase-detection pixels PHD17 and PHD18, the first phase-detection pixels PX115 and PX225 may sense the left image of the object OBJECT, and the second phase-detection pixels PX156 and PX266 may sense the right image of the object OBJECT. Since the image sensor 100 may perform the phase detection for an object OBJECT by calculating the disparity between the phase signals of a pair of the phase-detection pixels PHD17 and PHD18, it is possible to obtain the images having the different phases for the same object OBJECT.

The pixels arranged at the same position in the pixel groups PG1, PG2, and PG3 may be controlled by the same transmission signal. Except for the phase-detection pixels PX115, PX116, PX155, PX156, PX225, PX226, PX265, and PX266, the other pixels PX may be controlled by the same transmission signal among the pixels arranged at the corresponding position within the pixel group. Also, a pair of phase-detection pixels PHD17 and PHD18 may be controlled by the same transmission signal.

First, the transmission signal controlling a pair of phase-detection pixels PHD17 and PHD18 is transitioned to a high level H. Specifically, the charges provided from the photovoltaic device of each of the sub-pixel PX115 and the sub-pixel PX156 of a pair of phase-detection pixels PHD17 may be accumulated in the floating diffusion region corresponding to each of the pixel units PU11 and PU15. The pixel unit PU11 may output the phase signal based on the charges accumulated in the corresponding floating diffusion region, and the pixel unit PU15 may output the phase signal based on the corresponding floating diffusion region. The CDS circuit 151 may derive the phase information for the object OBJECT by performing the correlated double sampling operation on the phase signals from each of the pixel units PU11 and PU15. Similarly, a pair of phase-detection pixels PHD18 may be operated similarly to output the phase signal from each pixel unit, and the CDS circuit 151 may derive the phase information from the phase signal received from each pixel unit. Thereafter, all of the remaining transmission signals except for the transmission signals controlling a pair of phase-detection pixels PHD17 and PHD18 are transitioned to a high level H. Specifically, the charge accumulated in the photovoltaic device in the remaining sub-pixels PX111-PX114 and PX116-PX119 in the pixel unit PU11 and the charge accumulated in the photovoltaic device in the remaining sub-pixels PX151-PX155 and PX157-PX159 in the pixel unit PU15 may be accumulated in the floating diffusion region corresponding to each of the pixel units PU11 and PU15. Thereafter, each of the pixel units PU11 and PU15 may output the pixel signal based on the charge accumulated in the corresponding floating diffusion region, and the CDS circuit 151 may derive the image information for the object OBJECT based on the pixel signal from each of the pixel units PU11 and PU15. Similarly, a pair of phase-detection pixels PHD18 operates similarly to output the pixel signal from each pixel unit, and the CDS circuit 151 may derive the image information from the pixel signal received from each pixel unit.

Figure 17:
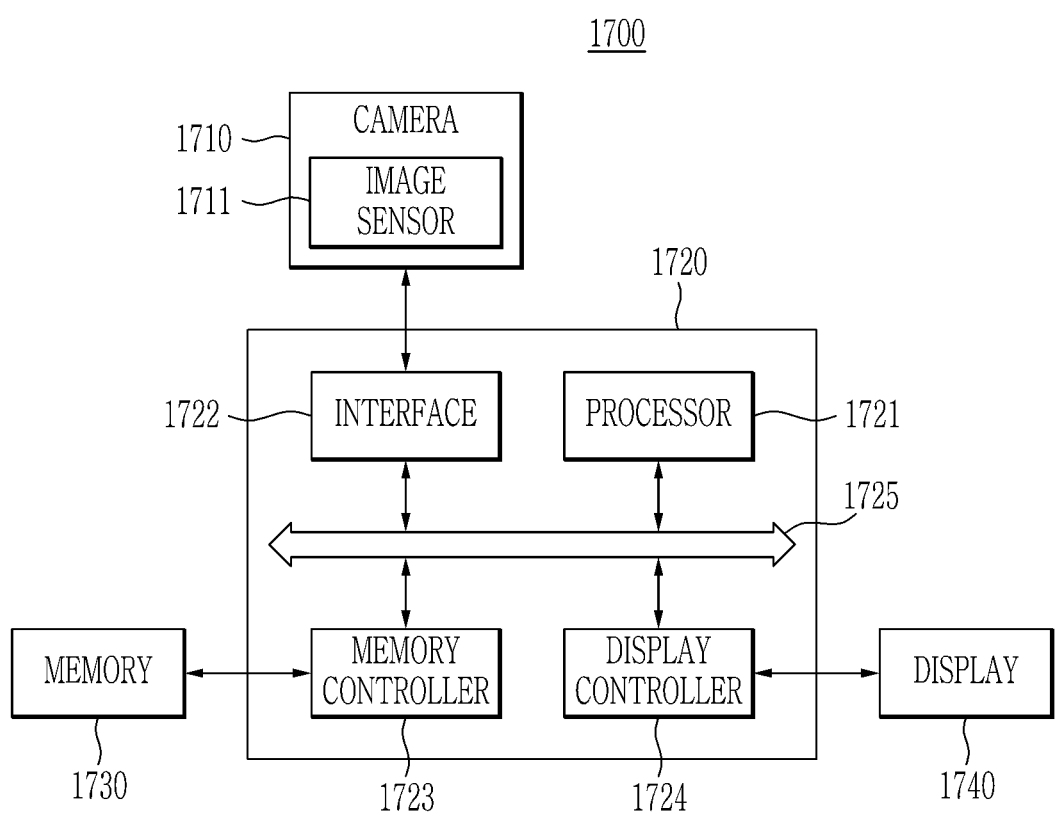
FIG. 17 is an exemplary block diagram of a computer device according to an embodiment.

FIG. 17 is an example block diagram of a computer device according to an embodiment.

Referring to FIG. 17, the computer device 1700 may include a camera 1710, a controller 1720, a memory 1730, and a display 1740.

The camera 1710 may include an image sensor 1711. The image sensor 1711 may be implemented with the image sensor described above with reference to FIG. 1 to FIG. 16. The camera 1710 may generate an image signal by using the image sensor 1711, perform the image signal processing on the image signal, and output the processed image signal to the controller 1720.

The controller 1720 may include a processor 1721. The processor 1721 may control the overall operation of each component of the computing device 1700. The processor 1721 may be implemented as at least one of various processing units such as a central processing unit (CPU), an application processor (AP), and a graphics processing unit (GPU). In some embodiments, the controller 1720 may be implemented as an integrated circuit or a system on chip (SoC).

in some embodiments, as shown in FIG. 17, the controller 1720 may further include an interface 1722, a memory controller 1723, a display controller 1724, and a bus 1725. in some embodiments, at least a part of the interface 1722, the memory controller 1723, the display controller 1724, and the bus 1725 may be provided outside the controller 1720. in some embodiments, the controller 1720 may further include an image signal processor.

The interface 1722 may transmit the image signal received from the image sensor 1711 to the memory controller 1723 or the display controller 1724 through the bus 1725.

The memory 1730 may store various data and instructions. The memory controller 1723 may control the transferring of the data or instructions to and from the memory 1730.

The display controller 1724 may transmit the data to be displayed on the display 1740 to the display 1740 under the control of the processor 1721, and the display 1740 may display a screen according to the received data. In some embodiments, the display 1740 may further include a touch screen. The touch screen may transmit a user input for controlling the operation of the computer device 1700 to the controller 1720. The user input may be generated when the user touches the touch screen.

The bus 1725 may provide communication functions between constituent elements of the controller 1720. The bus 1725 may include at least one type of bus according to a communication protocol between constituent elements.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An image sensor comprising:
   a first pixel group including a first pixel unit corresponding to a first color and including a plurality of first pixels arranged with an m×n form,
   a second pixel unit corresponding to a second color and including a plurality of second pixels arranged with the m×n form, and a third pixel unit corresponding to a third color and including a plurality of third pixels arranged with the m×n form, wherein m and n are natural numbers greater than or equal to 3; and
   a first micro lens formed on the first pixel unit and shared by at least two adjacent first pixels in a first direction among the plurality of first pixels.

2. The image sensor as claimed in claim 1, further comprising:
   a second pixel group including a fifth pixel unit corresponding to the first color and including a plurality of fifth pixels arranged with the m×n form, a sixth pixel unit corresponding to the second color and including a plurality of sixth pixels arranged with the m×n form, and a seventh pixel unit corresponding to the third color and including a plurality of seventh pixels arranged with the m×n form; and
   a second micro lens formed on the fifth pixel unit and shared by at least two fifth pixels adjacent in the first direction among the plurality of fifth pixels.

3. The image sensor as claimed in claim 2, further comprising a readout circuit to detect a phase difference for an object of the image sensor based on the charge of each of a first pixel of at least two first pixels positioned at one end of the first direction and a fifth pixel of the at least two fifth pixels positioned at the other end of the first direction.

4. The image sensor as claimed in claim 3, further comprising,
   a row driver connected to the first and second pixel groups through a plurality of row lines, wherein the first pixel of the at least two first pixels positioned at one end of the first direction and the fifth pixel of the at least two fifth pixels positioned at the other end of the first direction are connected together to a first row line among the plurality of row lines.

5. The image sensor as claimed in claim 2, wherein
   the first pixel group further includes a fourth pixel unit, which is adjacent to the first pixel unit in an oblique direction to the first direction, corresponds to the first color, and includes a plurality of fourth pixels arranged with the m×n form, and
   wherein the image sensor further includes a third micro lens shared by at least two of the fourth pixels that are adjacent in the first direction among the plurality of fourth pixels.

6. The image sensor as claimed in claim 5, wherein
   the second pixel group further includes an eighth pixel unit, which is adjacent to the fifth pixel unit in the oblique direction to the first direction, corresponds to the first color, and includes a plurality of eighth pixels arranged with the m×n form, and
   wherein the image sensor further includes a fourth micro lens shared by at least two eighth pixels adjacent in the first direction among the plurality of eighth pixels.

7. The image sensor as claimed in claim 6, further comprising:
   a readout circuit to detect a phase difference for an object of the image sensor based on a charge of each of a fourth pixel positioned at one end of the first direction among the at least two fourth pixels and an eighth pixel positioned at the other end of the first direction among the at least two eighth pixels.

8. The image sensor as claimed in claim 7, further comprising
   a row driver connected to the first and second pixel groups through a plurality of row lines,
   wherein the fourth pixel positioned at one end of the first direction among the at least two fourth pixels and the eighth pixel positioned at the other end of the first direction among the at least two eighth pixels are connected together to a first row line among the plurality of row lines.

9. The image sensor as claimed in claim 2, wherein the first pixel group and the second pixel group are adjacent in the first direction.

10. The image sensor as claimed in claim 2, wherein the first pixel group and the second pixel group are arranged repeatedly along a second direction intersecting the first direction.

11. The image sensor as claimed in claim 2, wherein the first pixel group and the second pixel group are adjacent to each other along a second direction intersecting the first direction.

12. The image sensor as claimed in claim 2, wherein the first pixel group and the second pixel group are alternately arranged along a second direction intersecting the first direction.

13. An image sensor comprising:
a pixel array including a first and second pixel groups each including a first pixel unit corresponding to a first color and including a plurality of first pixels arranged with an m×n form, a second pixel unit corresponding to a second color and including a plurality of second pixels arranged with the m×n form, and a third pixel unit corresponding to a third color and including a plurality of third pixels arranged with the m×n form, wherein each of the first and second pixel groups includes a first phase detection pixel and a second phase detection pixel located adjacent to each other in a first direction and covered by one micro lens, and m and n are natural numbers greater than or equal to 3; and
a readout circuit detecting a phase difference for an object of the image sensor based on a charge of each of the first phase detection pixel of the first pixel group and the second phase detection pixel of the second pixel group.

14. The image sensor as claimed in claim 13, wherein the first phase detection pixel and the second phase detection pixel of the first pixel group are positioned in the first pixel unit of the first pixel group, and the first phase detection pixel and the second phase detection pixel of the second pixel group are positioned in the first pixel unit of the second pixel group.

15. The image sensor as claimed in claim 14,
wherein the plurality of first pixels of the first pixel unit, and the first phase detection pixel and the second phase detection pixel of the first pixel group share a floating diffusion, and
wherein the readout circuit generates an image signal based on a charge accumulated in the floating diffusion by the plurality of first pixels, and the first phase detection pixel and the second phase detection pixel of the first pixel group.

16. The image sensor as claimed in claim 14, wherein each of the first and second pixel groups further includes a third phase detection pixel and a fourth phase detection pixel located adjacent to each other in the first direction and covered by one micro lens,
wherein the third phase detection pixel and the fourth phase detection pixel of the first pixel group are positioned in the second pixel unit of the first pixel group, and the third phase detection pixel and the fourth phase detection pixel of the second pixel group are positioned in the second pixel unit of the second pixel group, and
wherein the readout circuit further detects the phase difference based on a charge of each of the third phase detection pixel of the first pixel group and the fourth phase detection pixel of the second pixel group.

17. The image sensor as claimed in claim 13, further comprising:
a row driver connected to the pixel array through a plurality of row lines,
wherein the first phase detection pixel of the first pixel group and the second phase detection pixel of the second pixel group are connected together to a first row line among the plurality of row lines.

18. The image sensor as claimed in claim 13, wherein the pixel array further includes a third pixel group without the first phase detection pixel and the second phase detection pixel between the first pixel group and the second pixel group.

19. An image sensor comprising:
a pixel array including a plurality of pixel groups each including a first phase detection pixel and a second phase detection pixel located adjacent to each other in a first direction and covered by one micro lens, wherein the first nd second phase detection pixels output a phase signal based on a charge of each of the first phase detection pixel of a first pixel group among the plurality of pixel groups and the second phase detection pixel of a second pixel group among the plurality of pixel groups;
a ramp signal generator that sequentially generates a reset reference signal and a first set reference signal during a unit frame period; and
a readout circuit that detects a phase difference for an object of the image sensor based on a result of comparing a plurality of reset pixel signals received from the pixel array through a plurality of column lines with the reset reference signal and a result of comparing a first phase signal received from the first phase detection pixel of the first pixel group and a second phase signal received from the second phase detection pixel of the second pixel group with the first set reference signal.

20. The image sensor as claimed in claim 19,
wherein each of the plurality of pixel groups includes a plurality of pixel units,
wherein the first phase detection pixel and the second phase detection pixel are positioned in a first pixel unit among the plurality of pixel units of the first pixel group,
wherein the first pixel unit further includes a plurality of image sensing pixels,
the first phase detection pixel and the second phase detection pixel in the first pixel unit of the first pixel group and the plurality of image sensing pixels of the first pixel unit share a first floating diffusion,
wherein the pixel array outputs an image signal based on the charge accumulated in the first floating diffusion,
wherein the ramp signal generator further generates a second set reference signal, and
wherein the readout circuit derives image information for the object of the image sensor based on the result of comparing the second set reference signal and the image signal.

* * * * *